(12) United States Patent
McCall et al.

(10) Patent No.: US 11,046,131 B2
(45) Date of Patent: Jun. 29, 2021

(54) WEIGHT DISTRIBUTING AND SWAY CONTROL HITCH

(71) Applicant: B & W Custom Truck Beds, Inc., Humboldt, KS (US)

(72) Inventors: Travis M. McCall, Humboldt, KS (US); Tyler Jelinek, Manhattan, KS (US)

(73) Assignee: B & W Custom Truck Beds, Inc., Humboldt, KS (US)

(*) Notice: Subject to any disclaimer, the term of this patent is extended or adjusted under 35 U.S.C. 154(b) by 272 days.

(21) Appl. No.: 16/388,544

(22) Filed: Apr. 18, 2019

(65) Prior Publication Data

US 2020/0324591 A1 Oct. 15, 2020

Related U.S. Application Data

(60) Provisional application No. 62/659,467, filed on Apr. 18, 2018.

(51) Int. Cl.
*B60D 1/34* (2006.01)
*B60D 1/24* (2006.01)
*B60D 1/167* (2006.01)
*B60D 1/06* (2006.01)

(52) U.S. Cl.
CPC ............... *B60D 1/247* (2013.01); *B60D 1/06* (2013.01); *B60D 1/167* (2013.01); *B60D 1/345* (2013.01)

(58) Field of Classification Search
CPC .................................. B60D 1/247; B60D 1/06
See application file for complete search history.

(56) References Cited

U.S. PATENT DOCUMENTS

| | | | |
|---|---|---|---|
| 2,597,657 A | 5/1952 | Mathisen |
| 3,011,799 A | 12/1961 | Lance |
| 3,129,957 A | 4/1964 | Bernard et al. |
| 3,194,584 A | 7/1965 | Reese |
| 3,403,928 A | 10/1968 | Laughlin |
| 3,490,788 A | 1/1970 | Mann |
| 3,542,395 A | 11/1970 | Millikan |
| 3,552,771 A | 1/1971 | Hendricks |
| 3,567,251 A | 3/1971 | Dalton |
| 3,600,004 A | 8/1971 | Newkirk |
| 3,730,554 A | 5/1973 | Saunders |
| 3,731,950 A | 5/1973 | Burcham |
| 3,779,407 A | 12/1973 | Gillem |

(Continued)

*Primary Examiner* — Tony H Winner
(74) *Attorney, Agent, or Firm* — Erickson Kernell IP, LLC; Kent R. Erickson

(57) ABSTRACT

A weight distributing hitch for towing a trailer includes a pair of deflection bars extending rearward from a ball mount head. A distal end of each deflection bar is supported by a deflection bar support connected to the frame by a height adjustable bracket assembly. A first resistance feature on the deflection bar support engages a second resistance feature associated with the deflection bar to restrain the deflection bar from sliding relative to the deflection bar support and thereby preventing swaying of the trailer relative to the towing vehicle. A longitudinal position of the second resistance feature relative to the deflection bar or a longitudinal position of the first resistance feature relative to said deflection bar supported by said deflection bar support is adjustable to position the second resistance feature in engagement with the first resistance feature when the deflection bar is supported on the deflection bar support.

18 Claims, 18 Drawing Sheets

(56) References Cited

U.S. PATENT DOCUMENTS

| | | |
|---|---|---|
| 3,814,463 A | 6/1974 | Tunesi |
| 3,879,061 A | 4/1975 | Thompson |
| 3,900,212 A | 8/1975 | Ewing |
| 4,053,174 A | 10/1977 | Guettler, Jr. |
| 4,213,627 A | 7/1980 | Thompson |
| 4,230,333 A | 10/1980 | Persyn |
| 4,815,752 A | 3/1989 | Young et al. |
| 5,580,076 A | 12/1996 | DeRoule et al. |
| 6,045,147 A | 4/2000 | Schmidt et al. |
| 6,419,257 B1 | 7/2002 | McCoy et al. |
| 7,857,344 B2 | 12/2010 | Hensley |
| 7,934,742 B2 | 5/2011 | Anderson et al. |
| 7,967,320 B2 | 6/2011 | Anderson et al. |
| 8,186,702 B2 | 5/2012 | McCoy et al. |
| 8,628,107 B2 | 1/2014 | Harper et al. |
| 8,641,075 B1 | 2/2014 | Angel |
| 8,833,789 B2 | 9/2014 | Anderson |
| 2013/0056956 A1 | 3/2013 | Mauerman et al. |
| 2014/0225350 A1 | 8/2014 | Gramlin |
| 2014/0265240 A1 | 9/2014 | McCoy et al. |

WEIGHT DISTRIBUTING AND SWAY CONTROL HITCH

This application claims the benefit of U.S. Provisional Application Ser. No. 62/659,467, entitled Weight Distributing and Sway Control Hitch, filed Apr. 18, 2018, the disclosure of which is hereby incorporated herein in its entirety by reference.

BACKGROUND OF THE INVENTION

Field of the Invention

The present invention relates generally to weight distributing and sway control trailer hitches.

Background of the Invention

The increased utilization of rear receiver hitches or bumper hitches for towing trailers has increased the demand for weight distributing hitches which are also designed to prevent uncontrolled swaying of the trailer relative to the towing vehicle. Gooseneck or fifth wheel hitches are typically mounted just forward of a rear axle of a pick-up truck and thereby help distribute the load more evenly relative to the towing vehicle. Because rear receiver hitches or bumper hitches are mounted in spaced relation behind the rear axle, the weight of a loaded trailer bearing down on the hitch functions to raise the front end of the vehicle and front wheels relative to the rear wheels which reduces steering control. Swaying of the trailer relative to the towing vehicle also reduces steering control.

Weight distributing hitches incorporating spring arms or bars are known and used to take some of the weight off of the hitch ball of the weight distributing hitch to which the trailer is coupled. The spring arms may also be referred to as deflection bars or beams. In a typical configuration, a first end of each spring arm is connected to a ball mount and a second end of each spring arm is supported, under deflection, on a support surface connected to a respective trailer frame. Supporting the spring arm, under deflection, on the support surface creates a moment arm which urges the first end of each spring arm and the ball mount upward to counteract any downward forces imparted on trailer tongue by the weight of the trailer and its load.

The second end of each spring arm preferably is allowed to slide relative to the support surface to accommodate turning of the trailer. In U.S. Pat. No. 6,419,257 of McCoy et al which issued Jul. 16, 2002, the support surface comprises a cam, and a cam follower is formed on the end of each spring arm. Abutment of the cam surfaces of each cam follower against the corresponding cam resists sliding of the spring arm relative to the cam follower unless sufficient force is applied by turning of the towing vehicle relative to the trailer. The resistance prevents or resists swaying of the trailer.

In the weight distributing hitch shown in U.S. Pat. No. 6,419,257 of McCoy et al., the cam is supported below the trailer on an adjustable length cam arm. The height the cam is supported below the trailer frame is adjustable using a lift chain connected to the cam and a lift unit including a hook which is mounted on the trailer frame. Raising the cam relative to the trailer frame increases the deflection of the spring arm and the opposing, upwardly directed force exerted on the ball mount head to counteract greater downward forces acting on the ball mount head by a heavier trailer. However, raising the cam changes or shortens the longitudinal spacing of the cam follower behind the ball mount. The length of the arm supporting the cam is adjustable to ensure that the spacing of the cam relative to the cam follower positions the cam surface of the cam follower to engage the cam when the trailer extends straight behind the tow vehicle. Other known weight distributing hitches require unbolting and sliding of a mounting bracket for each support surface for the spring arms to adjust the position of the support surfaces relative to the spring arms which can be difficult and time consuming. Although the length adjustable cam support arm disclosed in U.S. Pat. No. 6,419,257 is generally easier to adjust than unbolting and sliding mounting brackets as in other existing weight distributing hitches, the additional components required add to the cost of the product and increase installation time.

SUMMARY OF THE INVENTION

In the weight distributing of the present invention, the support surface is formed as a shelf connected to the trailer frame by a mounting bracket. The height of the support surface relative to the mounting bracket is adjustable using pins extending through aligned sets of holes in the shelf and the mounting bracket. A hemispherical projection, or first mating feature, is formed on the upper surface of the shelf. A position adjustable block is secured on each spring arm or deflection bar near the end opposite the ball mount. A recess, or second mating feature, sized to receive the hemispherical projection on the shelf is formed on the bottom of the position adjustable block.

A bore is formed through the block to receive the end of the spring arm so that the block can be slid relative to the spring arm. The longitudinal position of the block relative to the spring arm can be adjusted by sliding the block relative to the spring arm and then fixed using set screws extending through the block and engaging the spring arm. The longitudinal position of the slide block relative to the spring arm is adjustable so that the recess in the slide block mates with the hemispherical projection on the shelf surface depending on the height of the shelf and the degree to which the spring arm must be bent or loaded to support the slide block connected to the spring arm on the shelf. Engagement of the recess in the block with the hemispherical projection on the shelf surface resists sliding of the block and the spring arm relative to shelf surface until a force applied longitudinally through the spring arm urges the recess in the block out of engagement with the hemispherical projection on the support shelf.

In an alternative embodiment, a notched spring arm is supported on a roller which is supported on a roller support which is mounted on a support bracket connected to the trailer frame. The height of the roller support is adjustable relative to the support bracket and the position of the roller relative to the spring arm is longitudinally adjustable.

DETAILED DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Figure 7:
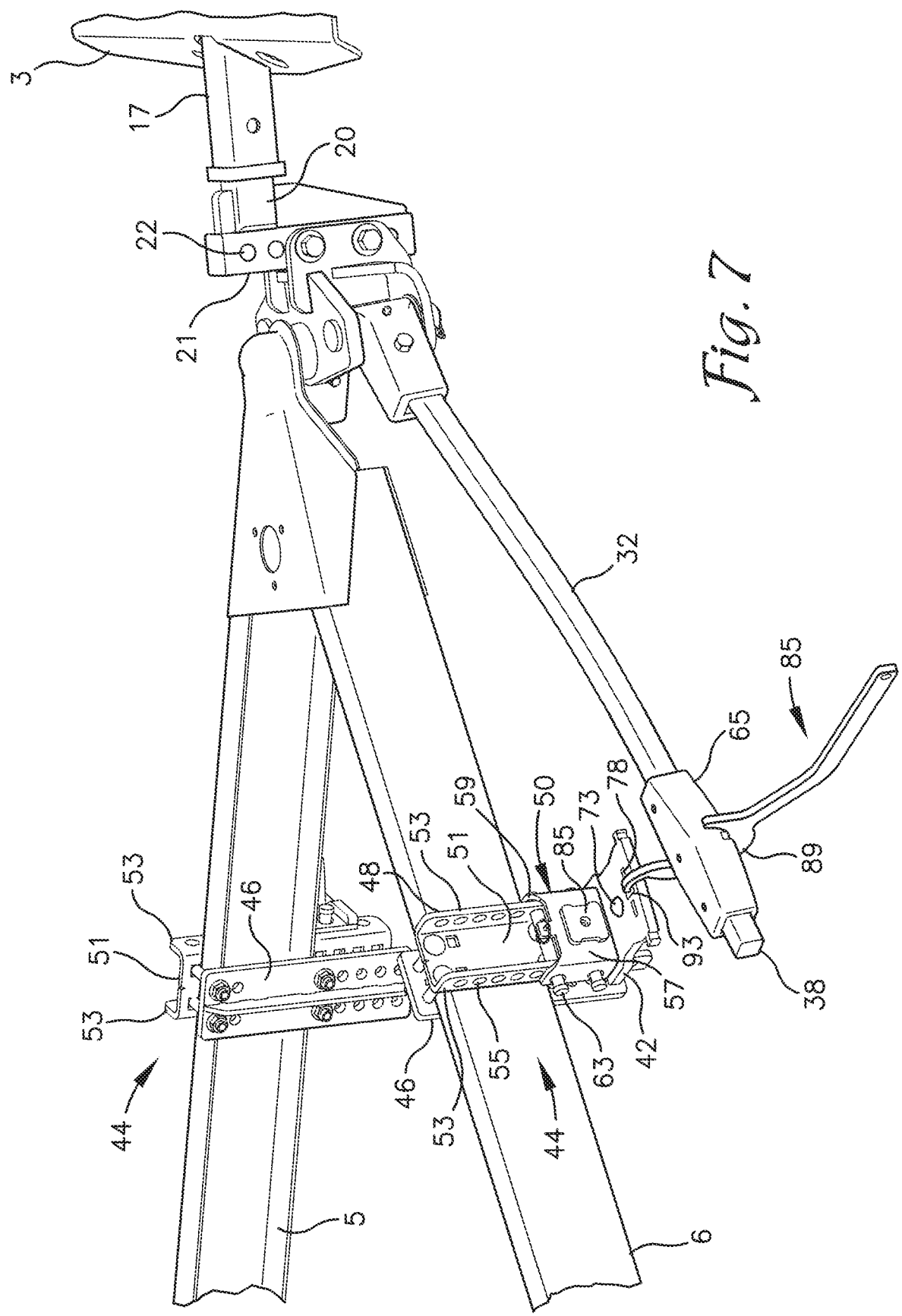
FIG. 7 is a fragmentary, right side perspective view of the weight distributing hitch connected to a trailer as shown in FIG. 4 and showing the tool in use for loading the spring arm and slide block onto the support shelf.

Referring to FIGS. 1 through 4 and 7 through 11, a weight distributing hitch assembly 1 is shown which is used to connect a trailer 2 to a towing vehicle 3 (see FIG. 7). The trailer 2 is typically of the type having two frame members or frame rails 5 and 6 connected to and extending rearward from a coupler 8. The coupler 8 is removably securable to a hitch ball 11 connected to the towing vehicle 3. In the weight distributing hitch 1, the hitch ball 11 is connected to a ball mount head 13 which is connected to a drop bar assembly 15 which is removably securable within a receiver 17 of a receiver hitch mounted on the rear of the towing vehicle 3. The drop bar assembly 15 includes a shank 20 which is slidably securable within the receiver 17 and a drop bar 21 with a plurality of holes 22 extending side to side through the drop bar 21.

The ball mount head 13 generally comprises upper and lower, horizontal flange plates 24 and 25 projecting rearward and vertical flange plates or clevis 27 welded to and projecting forward of the horizontal flange plates 24 and 25. A pair of vertically aligned sets of mounting holes (not seen) are formed in the clevis 27 for selectively securing the ball mount head 13 at one of a plurality of selected heights relative to the drop bar 21. Mounting pins 30 insertable in aligned mounting holes in the clevis 27 and drop bar 21 are used to fix the vertical position of the ball mount head 13 relative to the drop bar 21. The hitch ball 11 is secured to and projects upward from the upper, horizontal flange plate 24 of ball mount head 13.

Forward ends of a pair of deflection bars 32 are pivotally secured between the upper and lower, horizontal flange plates 24 and 25 on opposite sides of the hitch ball 11 and pivot about a vertical axis or axis extending transverse to the horizontal flange plates 24 and 25. The deflection bars 32 may also be referred to as torsion bars or spring arms. A pivot bearing 35 is secured on the forward end of each deflection bar 32 and is rotatably secured around a pivot pin 36 secured between the upper and lower flange plates 24 and 25. The deflection bars 32 generally extend rearwardly along the outer sides of the trailer frame members 5 and 6 respectively As seen in FIG. 7, the distal or rear end 38 of each deflection bar 32 normally extends below a respective one of the trailer frame members 5 and 6. The deflection bars 32 are sufficiently resilient to allow the rear end 38 of each deflection bar 32 to be pulled or drawn up and onto a support shelf 42 connected to each of the trailer frame members 5 and 6 respectively.

The support shelves 42 are each part of a deflection bar support assembly 44 connected to each trailer frame member 5 and 6. Each deflection bar support assembly 44 includes a back plate 46, a vertically oriented support bracket or trailer frame mount 48 and a mounting bracket 50 fixedly connected to or formed as part of the support shelf 42. Each support bracket 48 is generally U-shaped, including a central web 51 and laterally projecting legs 53 extending transverse to the central web 51 on opposite sides thereof. A plurality of pin receiving holes 55 are formed in each leg 53 in vertical and equally spaced alignment. Each support bracket 48 is connected to a respective trailer frame member 5 or 6 by bolting it to a back plate 46 with the frame member 5 or 6 sandwiched therebetween and with the legs 53 of each support bracket 48 projecting transverse to and outward from the frame member 5 or 6 to which it is connected.

Figure 4:
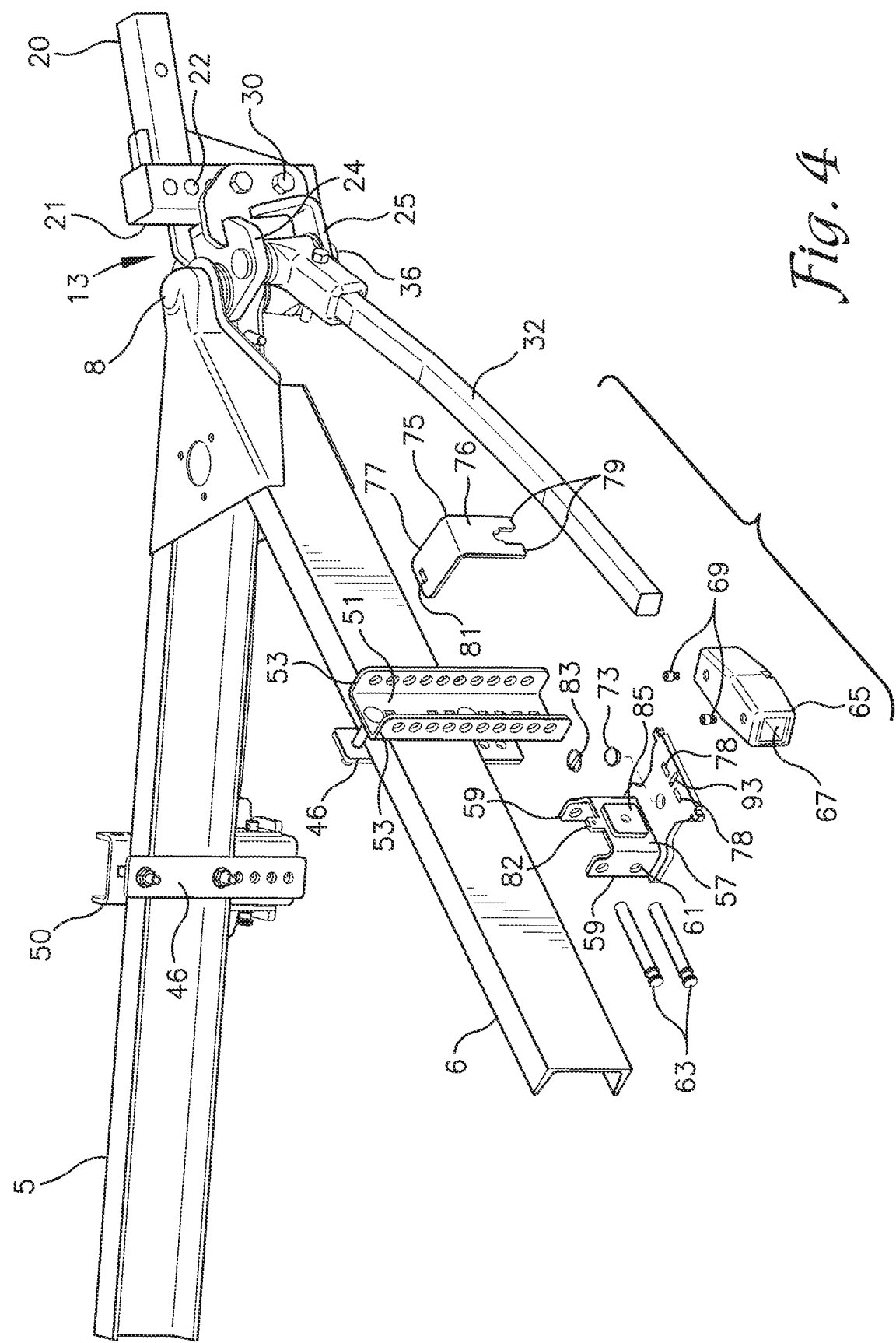
FIG. 4 is a partially exploded and fragmentary, right side perspective view of the weight distributing hitch attached to the trailer and showing a spring arm on a right side of the trailer removed disengaged from a support shelf of the weight distributing hitch.

The mounting bracket 50 for each support shelf 42 extends transverse to the support shelf 42 and in the embodiment shown extends vertically above the support shelf 42 and on one side thereof. The mounting bracket 50 is also generally U-shaped with a central web 57 and legs 59 extending transverse to the central web 57 and generally away from the support shelf 42. As best seen in FIG. 4, a pair of vertically aligned, pin receiving holes 61 are formed in each leg 59 of the mounting bracket 50. In the embodiment shown, the legs 59 of mounting bracket 50 are spaced just wider than the legs 53 of support bracket 48. The legs 59 of mounting bracket 50 may be placed in overlapping relationship with legs 53 of support bracket 48 and then pins 63 may be inserted through aligned pin receiving holes 61 and 55 therein to selectively secure the mounting bracket 50 and support shelf 42 to the support bracket 48 at any one of a plurality of fixed heights relative to the support bracket 48. The mounting bracket 50 is secured to the support bracket 48 so that the support shelf 42 projects laterally or horizontally outward from the mounting bracket 48, the support bracket 48 and the associated frame member 5 or 6 when the frame member 5 or 6 is supported in a horizontal alignment.

As best seen in FIGS. 1-5, secured on each deflection bar 32 near a distal end thereof, is a block 65 which may also be referred to as an adjustable slide block 65. A bore 67 is formed in and extends longitudinally through the block 65. The bore 67 has a cross-sectional geometry which matches the cross-sectional geometry of the deflection bar 32. The block 65 is slid over the distal end of the deflection bar 32 and then selectively secured in place on the deflection bar 32 by securement means, which in the embodiment shown comprises set screws 69 extending through a threaded bore in block 65 and into frictional engagement with the deflection bar 32.

In the embodiment shown, top and bottom surfaces of the block 65 are generally planar and formed as hexagons that are wider in the middle and narrower on the ends with sloping sides from the middle to the ends. The block 65 therefore has eight polygonal sides and is wider at the middle than on the ends. The sides may also be described as bowing outward from the ends toward the middle and it is foreseen that the sides could be curved instead of inclined planar surfaces.

Figure 5:
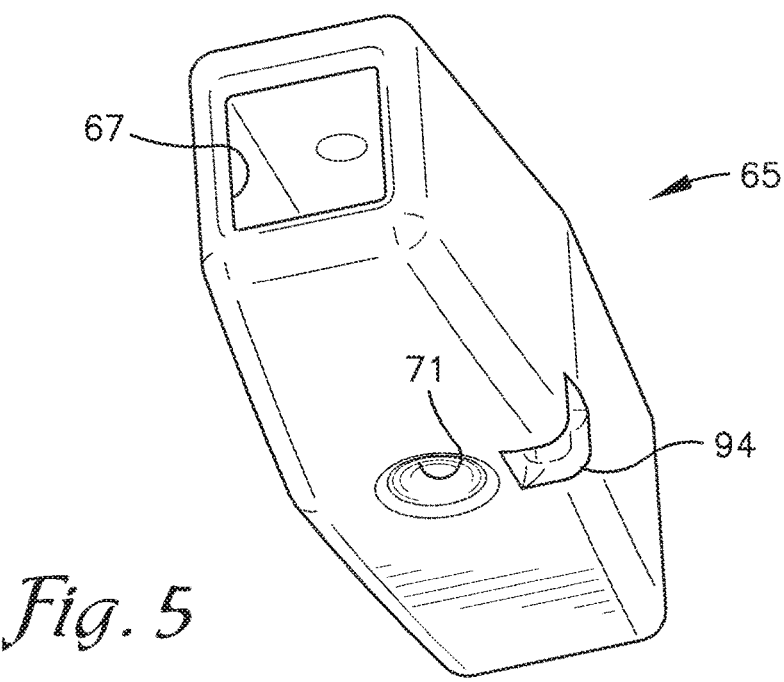
FIG. 5 is a bottom perspective view of a slide block adapted to be secured to each of the spring arms.

As best seen in FIG. 5, a hemispherical recess or second resistance feature 71 is formed centrally in the bottom surface of block 65 and is adapted to matingly receive a hemispherical projection or first resistance feature 73 formed on or attached to and projecting upward from an upper surface of the support shelf 42. As shown in FIG. 4, the projection 73 may be formed separately from the support shelf 42 and secured to the support shelf 42 by press fitting or welding or other means. The projection 73 is generally centrally located between the mounting bracket 50 and an outer edge of the support shelf 42.

Figure 1:
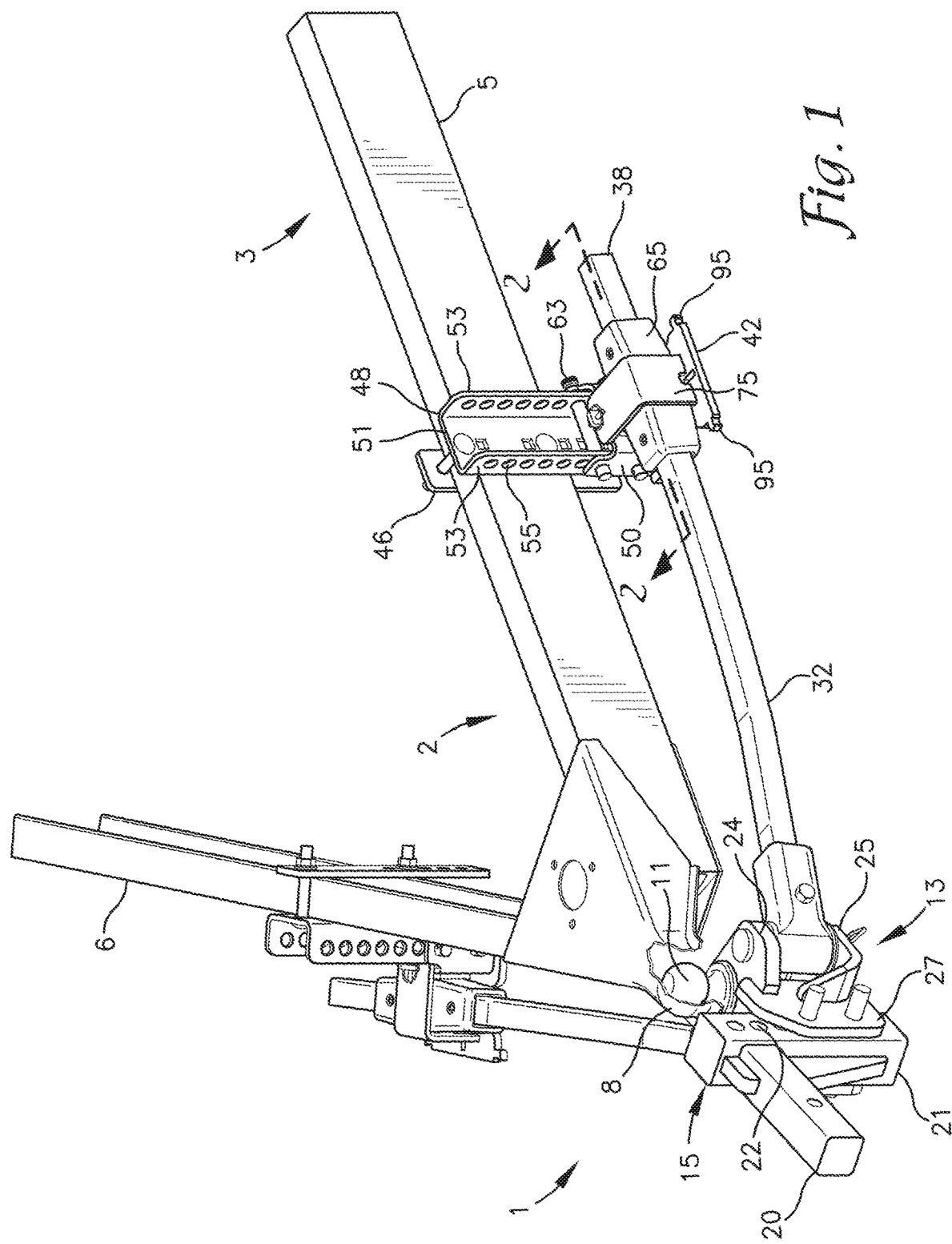
FIG. 1 is a fragmentary, front, perspective view of a weight distributing hitch attached to a trailer with portions of a coupler on the trailer broken away to show a hitch ball of the weight distributing hitch.
Figure 2:
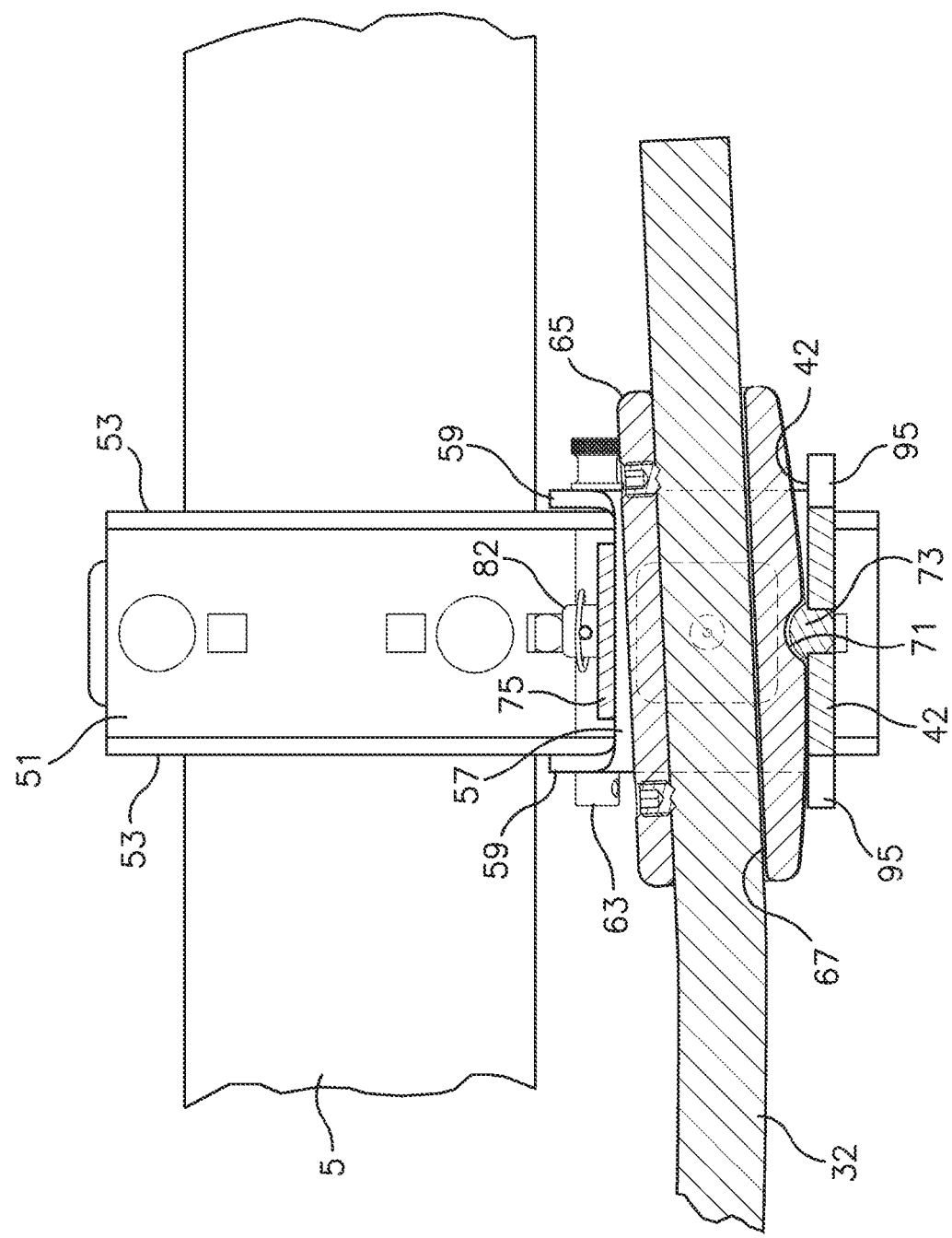
FIG. 2 is an enlarged and fragmentary cross-sectional view of the weight distributing hitch taken along line 2-2 of FIG. 1.
Figure 3:
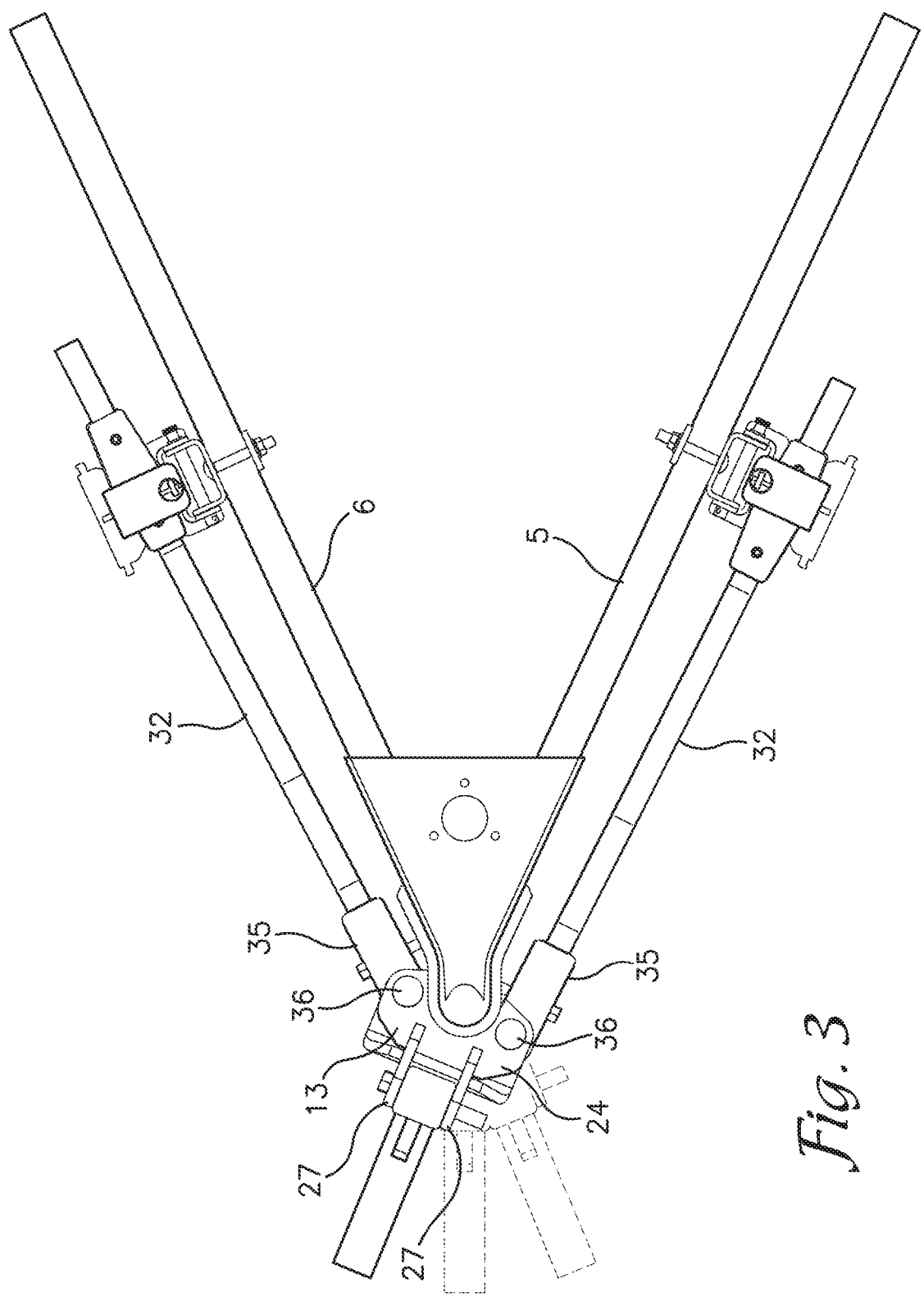
FIG. 3 is a fragmentary, top plan view of the weight distributing hitch attached to the trailer.

As shown in FIG. 2, the adjustable slide block 65 is positioned and secured on the deflection bar 32 so that when the deflection bar 32 and block 65 are loaded onto the support shelf 42, the hemispherical recess 71 is aligned with and receives the hemispherical projection 73 on the support shelf 42. More specifically, prior to loading the adjustable slide block 65 and deflection bar 32 onto the support shelf 42, the set screws 69 are loosened so that the block 65 is free to slide longitudinally relative to the deflection bar 32. The adjustable slide block 65 are generally positioned longitudinally relative to the deflection bar 32 so that recess 71 in block 65 is approximately aligned with projection 73 on the support shelf 42. When the block 65 and deflection bar 32 are loaded onto the support shelf 42, the block 65 can slide relative to the deflection bar 32 to self-align or manually align the recess 71 in block 65 over projection 73. The set screws 69 are then tightened to fix the position of the block 65 relative to deflection bar 32 with the projection 73 received within recess 71. Loading of the block 65 and deflection bar 32 onto the support shelf 42 requires the distal end of the deflection bar 32 to be drawn upward such that when the slide block 65 is seated on the support shelf 42, the deflection bar 32 and block 65 exert a downward force on the support shelf 42 creating a moment arm through the deflection bar 32 which urges the front end of the deflection bar 32 and the ball mount head 13 to which it is connected upward.

The downward force exerted on the distal end of the deflection bar 32 and on the block 65 against the shelf 42 also functions to hold or seat the hemispherical projection 73 in mating alignment within the recess 71 in the block 65. Abutment of the projection 73 against the portions of the block 65 surrounding the recess 71 in which the projection 73 is received, resists sliding of the block 65 and the deflection bar 32 relative to the shelf 42.

A removable retainer bracket 75 is provided and may be connected between an outer edge of the shelf and an upper edge of the mounting bracket 50 and over the block 65 positioned on shelf 42. In the embodiment shown in FIGS. 1-11, and with reference to FIG. 4, the retainer bracket 75 is generally L-shaped with a vertical leg 76 and horizontal leg 77. A pair of slots 78 are formed in and extend proximate and parallel to the outer edge of the shelf 42 and are adapted to receive tabs or feet 79 projecting downward from the vertical leg 76 of retaining bracket 75. A tab receiving slot 81 is formed in a distal end of horizontal leg 77 and sized to matingly receive a tab 82 projecting upward from the upper edge of the mounting bracket web 57. A hole is formed in the tab 82 for receiving a locking pin 83 to secure the retainer bracket 75 to the mounting bracket 50 over and around the block 65. A wear pad 85 is formed on or connected to the outer surface of the web 57 of the mounting bracket 57.

With the deflection bar 32 and adjustable slide block 65 loaded onto the support shelf 42 and the projection 73 on shelf 42 received in recess 71 of block 65, the block and deflection bar 32 are restrained from sliding relative to the support shelf 42 which prevents uncontrolled swaying of the trailer 2 relative to the towing vehicle 3. When the towing vehicle 3 turns relative the trailer 2, the force directed longitudinally through the deflection bar 32, on the side of the trailer 2 to which the vehicle turns, is sufficient to force the block 65 over the hemispherical projection 73 so that the deflection bar 32 and block 65 slide rearward relative to the shelf 42. At the same time, the longitudinal force drawn through the deflection bar 32 on the opposite side draws the associated slide block 65 over and past the projection 72 so that the deflection bar 32 and block 65 slide forward relative to the opposite shelf 42. The retaining bracket 75 prevents the deflection bar 32 and slide block 65 from coming off of the support shelf 42.

Figure 6:
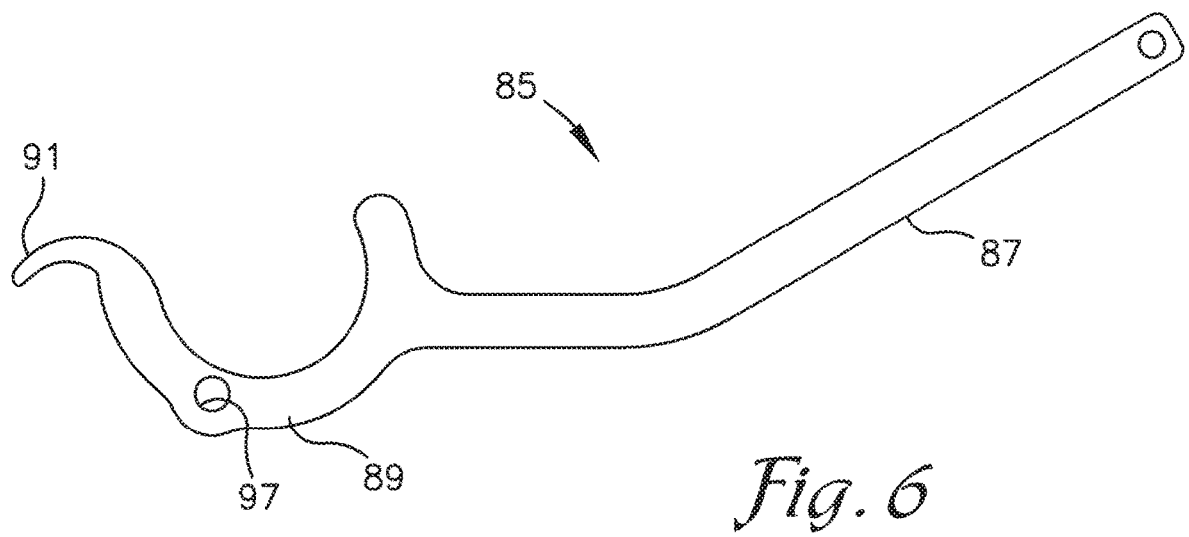
FIG. 6 is a side view of a tool for loading a spring arm and an associated slide block onto and off of the respective support shelf.

As best seen in FIGS. 7-10, loading and unloading of the adjustable slide block 65 and distal end of the deflection bar 32 onto and off of the support shelf 42 is facilitated using a loading tool 85 in the nature of a lever. Referring to FIG. 6, the loading tool 85 includes a handle or lever arm 87, a slide block cradle 89 and a pivot hook 91 extending from the distal end of the cradle 89 opposite the handle 87. A hook receiving slot 93 is formed in the support shelf 42 between the slots 78 for the retainer bracket feet 79. Hook receiving slot 93 is positioned proximate the outer edge of the shelf 42 and generally medially between front and rear ends of the shelf 42.

Figure 8:
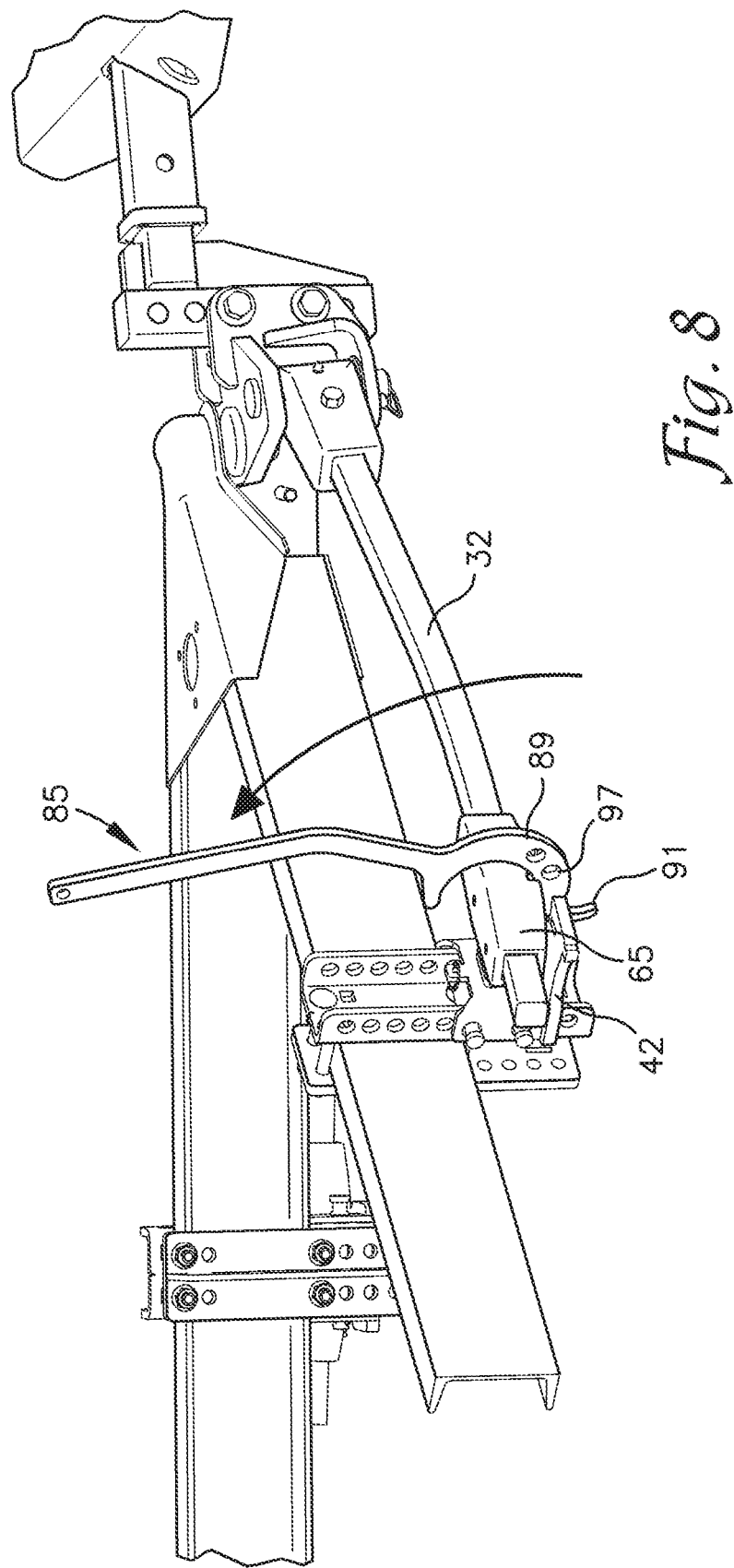
FIG. 8 is a view similar to FIG. 7 showing the tool pivoted for loading the spring arm and slide block onto the support shelf.

Referring to FIG. 7, for loading the slide block 65 and deflection bar 32 onto the shelf 42, the tool 85 is positioned with the tip of the hook 91 positioned in slot 93 and the slide block 65, extending below the support shelf 42, is supported in the cradle 89. As best seen in FIG. 5, a groove 94 is formed in an outer surface of the slide block along a lower outer corner and medially between the ends of the slide block. The groove 94 is adapted to receive a portion of the cradle 89 to help maintain the tool 89 generally in transverse alignment with the block 65 and medially between the ends of the slide block 65. With the slide block 65 supported in the cradle 89 and hook 91 in slot 93, the user pivots the lever arm 87 and cradle 89 upward and towards the shelf 42 as shown in FIG. 8. The tool 85 is pivoted about the pivot hook 91 in slot 93, until the slide block 65 slides out of the cradle 89 and onto the shelf 42. The lever arm 85 is pivoted toward the shelf 42 until the hemispherical projection 73 on shelf 42 is received within the hemispherical recess 71 in block 65. As discussed previously, before loading the block 65 and deflection bar 32 onto the support shelf 42, the set screws 69 for connecting the block 65 to the deflection bar 32 are loosened, so the deflection bar 32 slides relative to the block 65 as the block 65 and deflection bar 32 are loaded onto the shelf 42 which allows the recess 71 in the block 65 to slide over and onto the projection 73 on the shelf without the deflection bar 32 moving the block 65 relative to the projection 73. Once the block is supported on the shelf 42 with the projection 73 in the recess 71, the set screws are tightened to fix the longitudinal position of the block 65 relative to the deflection bar 32.

With the slide block 65 and deflection bar 32 loaded onto the support shelf 42, the retainer bracket 75 is then secured over the slide block 65. Feet 79 of bracket 75 are inserted in the slots 78 in shelf 42 and tab 82 is inserted in tab receiving slot 81 in bracket 75. Locking pin 83 is then inserted in the hole in tab 82 to secure the retainer bracket 75 to the mounting bracket 50 over and around the block 65.

Figure 9:
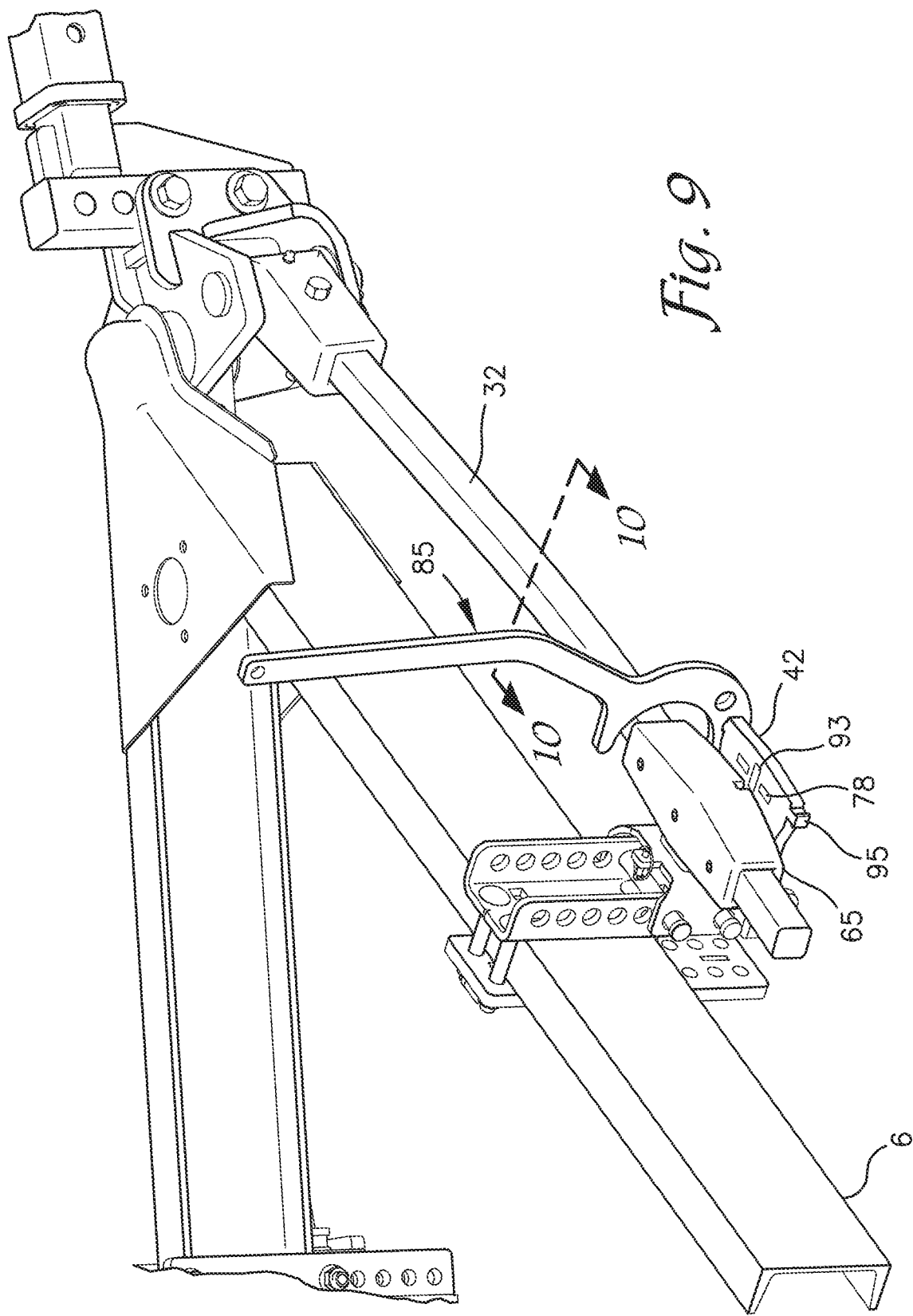
FIG. 9 is a view similar to FIG. 8 showing the tool positioned for unloading the spring arm and slide block off of the support shelf.
Figure 10:
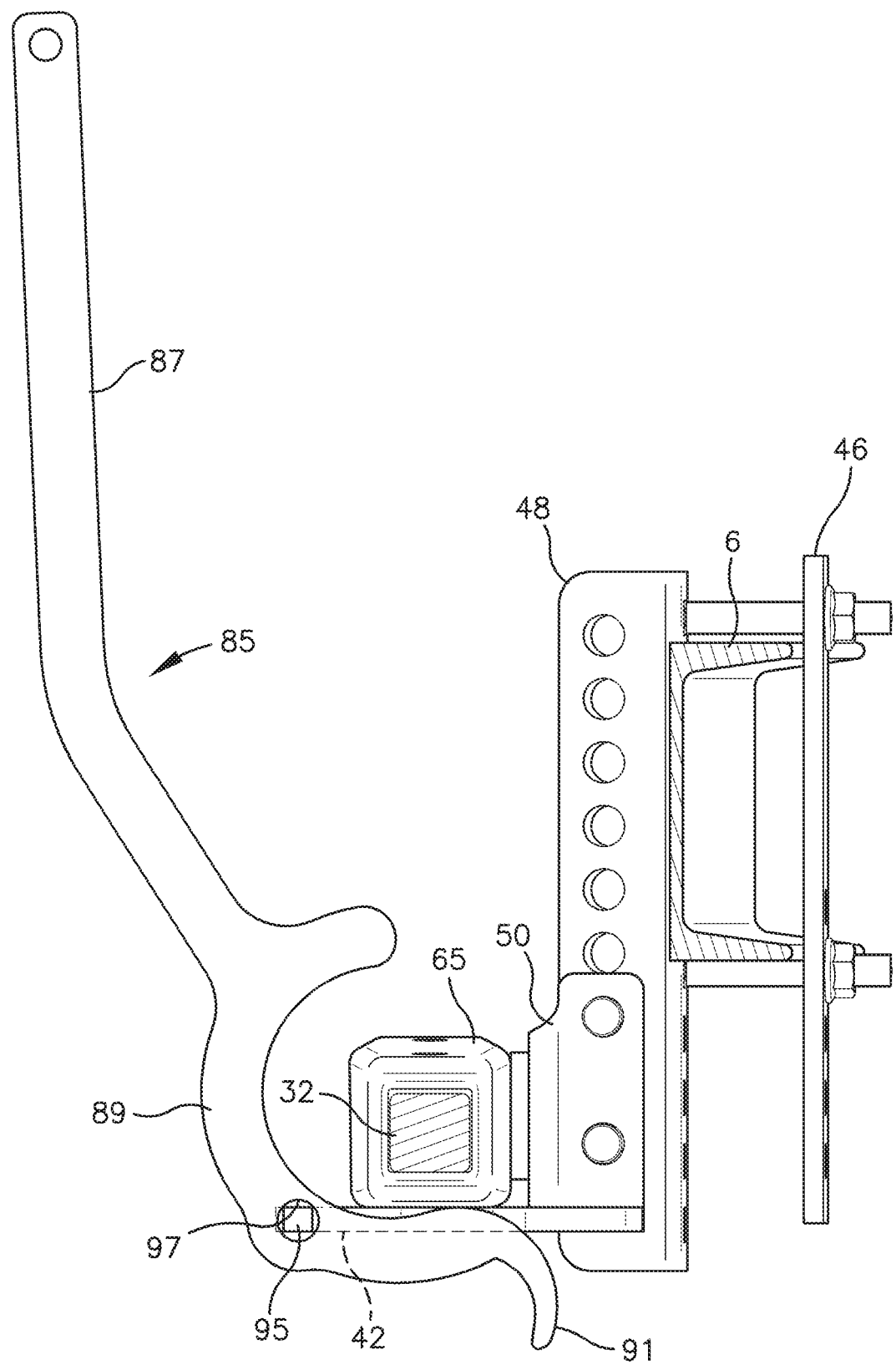
FIG. 10 is a cross-sectional view taken along line 10-10 of FIG. 9.
Figure 11:
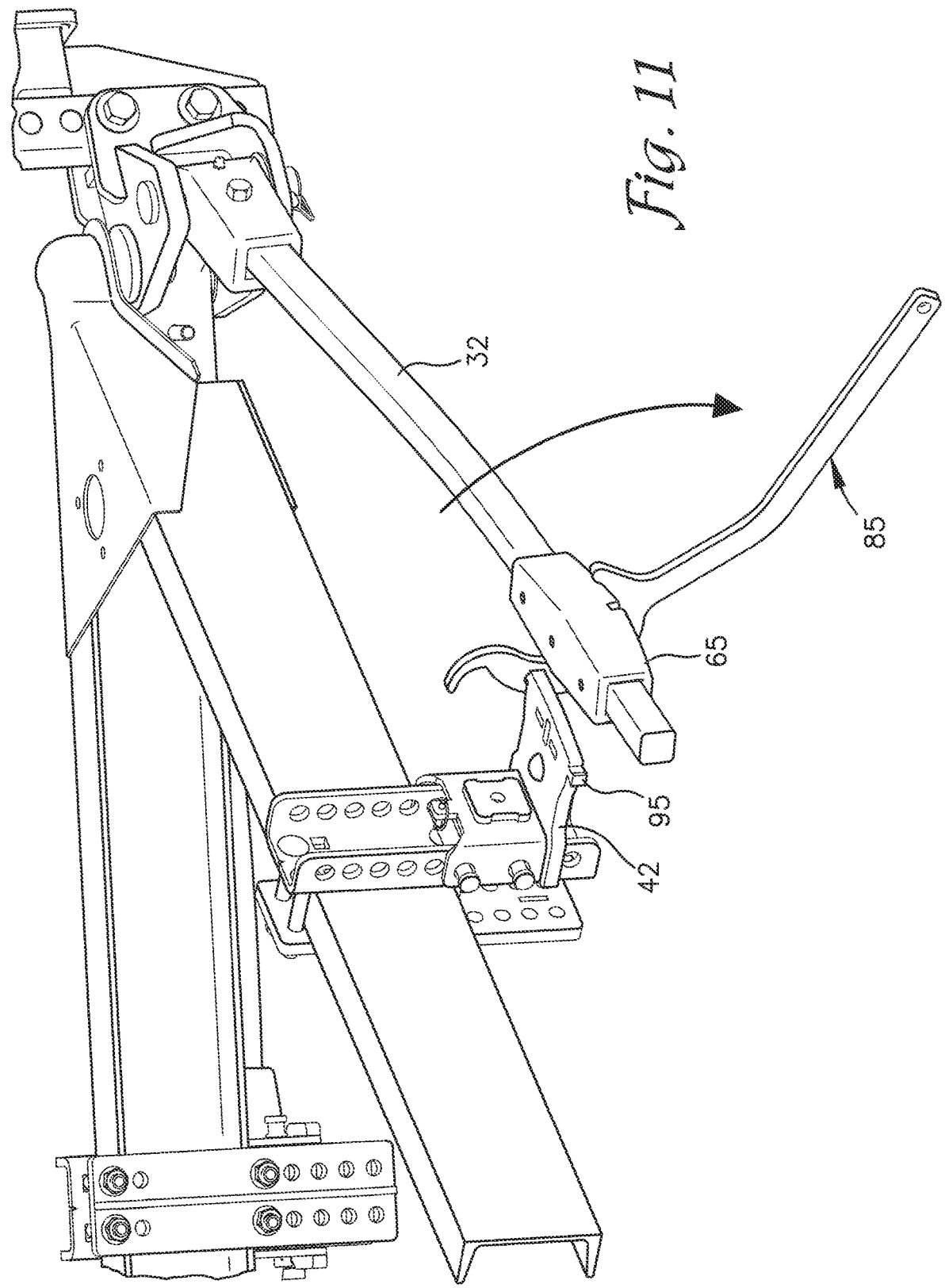
FIG. 11 is a view similar to FIG. 9 showing the tool pivoted to unload the spring arm and slide block off of the support shelf.
Figure 12:
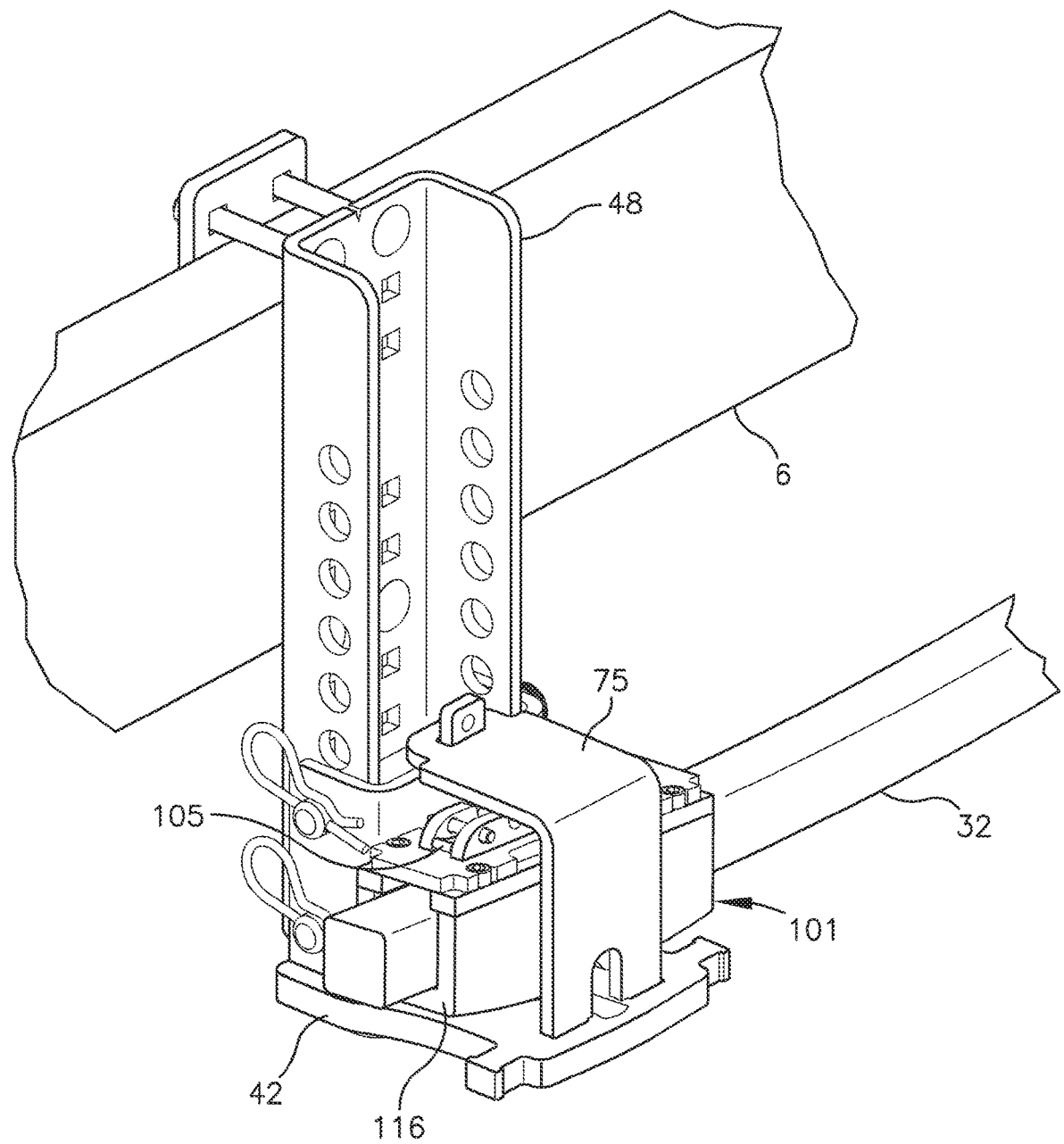
FIG. 12 is an enlarged and fragmentary perspective view of the weight distributing hitch showing an alternative slide block with a latch assembly for securing the slide block to a spring arm.
Figure 13:
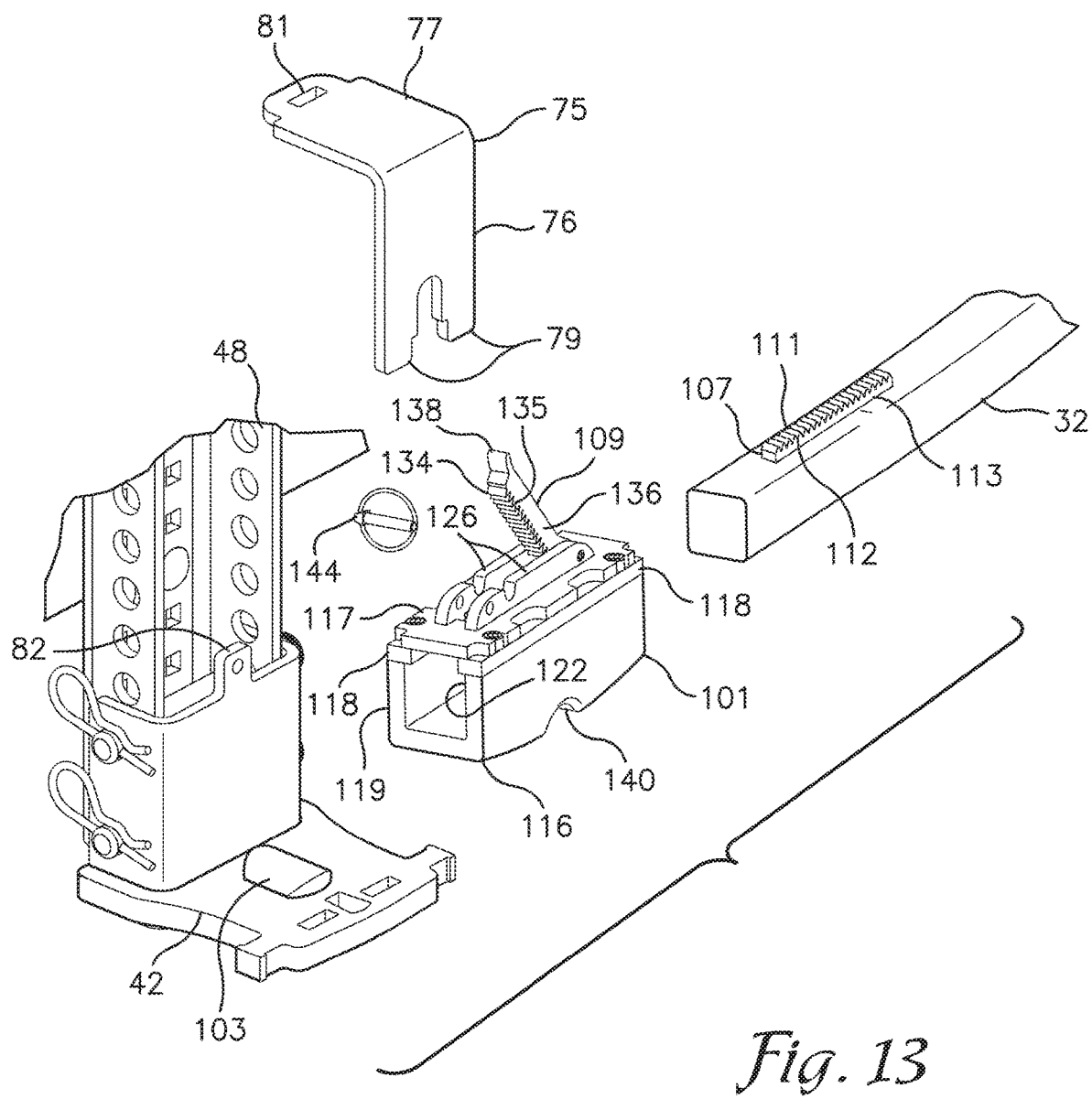
FIG. 13 is an exploded and fragmentary perspective view of the weight distributing hitch as shown in FIG. 12 with the alternative slide block and latching assembly and showing an alternatively shaped projection on the support shelf.

Referring to FIGS. 9 through 11, tool 85 may also be used to unload the deflection bar 32 and slide block 65 from shelf 42 after removing the retainer bracket 75. Pivot bearings 95 are formed on and project outward from each shelf 42, transverse to and proximate an outer end of the shelf 42 with one pivot bearing 95 extending towards the front of the trailer 2 and the other pivot bearing 95 extending toward the rear of the trailer 2. At least one bearing receiving hole 97 is formed in the body or portion of the tool 85 forming the cradle 89. To unload the deflection bar 32 and slide block 65 from shelf 42, the tool 85 is positioned against the front edge of the shelf 42 so that the forward extending pivot bearing 95 is received within bearing receiving hole 97, a forward extending end of the slide block 65 is partially received within the cradle 89. The back side of the pivot hook 91 is positioned to extend under and engage the slide block 65 past a center of the slide block 65 and on the side of the slide block closest to the respective trailer frame member 5 or 6. Pivoting of the lever arm 87 about bearing 95, downward and away from the shelf 42, pivots the back side of the hook 91 up against the lower distal edge of the slide block 65 (the edge closes to the respective trailer frame member 5 or 6) and away from the shelf 42, lifting the slide block off of projection 73 and into cradle 89. Further downward pivoting of the lever arm 87 draws the slide block 65 and deflection bar 32 off of and away from the shelf 42.

Unloading of the slide blocks 65 and deflection bars 32 from the shelves 42 allows adjustment of the position of the slide block 65 relative to the deflection bar 32 to adjust the weight distributing hitch 1 to counteract different loads supported on the trailer 2. As the load or weight supported on the trailer 2 increases, the counter acting deflection imparted on the deflection bars 32 is increased by raising the mounted position of the shelves 42 and associated mounting brackets 50 relative to their respective support brackets 48. By raising the shelves 42 the deflection bars 32 have to be bent more to position the slide blocks 65 and deflection bars on the respective shelves 42. The additional bend imparts increased counter acting upwardly directed forces on the ball mount head 13 through the deflection bars 32. The additional curvature imparted on the deflection bars 32 requires the slide blocks 65 to be secured further rearward on the respective deflection bar 32 so that the hemispherical recesses 71 in the slide blocks 65 will align with the hemispherical projections 73 on the shelves 42 when the deflection bars 32 and slide blocks 65 are loaded thereon.

FIGS. 12-15 show an alternative embodiment of an adjustable slide block 101 and a modified projection 103 which is elongated and generally forms a rounded ridge as opposed to the hemispherical shape of projection 73 of the embodiment shown in FIGS. 4 and 7. Adjustable slide block 101 is selectively secured to the torsion bar 32 using a toothed latch assembly 105 as the securement means instead of set screws 69. The toothed latch assembly 105 includes a latch base 107 welded or otherwise secured or formed on an upper surface of the torsion bar 32 and a pivoting latch member 109 which is pivotally connected to the adjustable slide block 101.

The latch base 107 may be formed from a toothed, rectangular strip of metal in the nature of a straight, rack gear. The latch base 107 shown includes a plurality of teeth 111 spaced apart by grooves or recesses 112 formed in a latch base body 113 in equally spaced relationship across an upper surface of the latch base body 113. A latch base 107 is welded or otherwise secured to an upper surface of each of the torsion bars 32 proximate a distal end thereof and with the teeth 111 and recesses 112 extending or opening upward and transverse to a longitudinal axis of the torsion bar 32 to which it is secured.

The adjustable slide block 101 is formed from a U-shaped base 116, a top plate 117 and a pair of spacers 118 positioned between the top plate 117 and upper ends of sidewalls 119 of the U-shaped base 116 with a passageway 122 extending longitudinally through the block 101. The passageway 122 is sized taller than and slightly wider than the torsion bars 32 to allow one of the blocks 101 to be slid onto the end of each torsion bar 32. The passageway 122 in each slide block 101 is taller than the height of the torsion bars 32 and tall enough to allow the torsion bar 32 with a latch base 107 secured thereto to pass through the passageway 122. A slot 124 is formed in and extends longitudinally through the top plate 117 and opens into the passageway 122. Pivot mounts 126 are formed on an upper surface of the top plate 117 and extend longitudinally adjacent the slot 124 on each side thereof. A pivot pin receiving bore 128 is formed in and extends transversely through each of the pivot mounts 126 proximate a first end thereof and a lock pin receiving bore 130 is formed in and extends transversely through each of the pivot mounts 126 proximate a second end thereof The latch member 109 is pivotally mounted to the pivot mounts 126 using pivot pin 132 extending through the pivot pin receiving bores 128 in the pivot mounts 126 and through an aligned pivot pin receiving bore (not shown) in the latch member 109. The latch member 109 is formed from a toothed, rectangular strip of metal in the nature of a straight, rack gear. The latch member 109 shown includes a plurality of teeth 134 spaced apart by grooves or recesses 135 formed in a latch member body 136 in equally spaced relationship across a lower surface of the latch member body 136. The spacing between teeth 134 in the latch member body 136 corresponds to the spacing between the teeth 111 of the latch base body 113 such that the teeth 111 and 134 intermesh when the latch member 109 is positioned over the latch base 107.

The latch member 109 is pivotally mounted to the pivot mounts 126 so that it can be pivoted to extend across the slot 124 in top plate 117 with the teeth 134 extending downward into the passageway 122. A finger grip or tab 138 is formed on and projects forward from the latch member body 136 on an end of the latch member body 136 opposite the pivot pin 132. The tab 138 may be grasped by a user to pivotally raise or lower the latch member 109 about pivot pin 132 and relative to slot 124. When the latch member 109 is pivoted downward, across the slot 132, the tab 138 extends past the distal end of the slot 132 and over the top plate 117 to prevent further downward pivoting of the latch member 109 relative to the slot 132.

Figure 14:
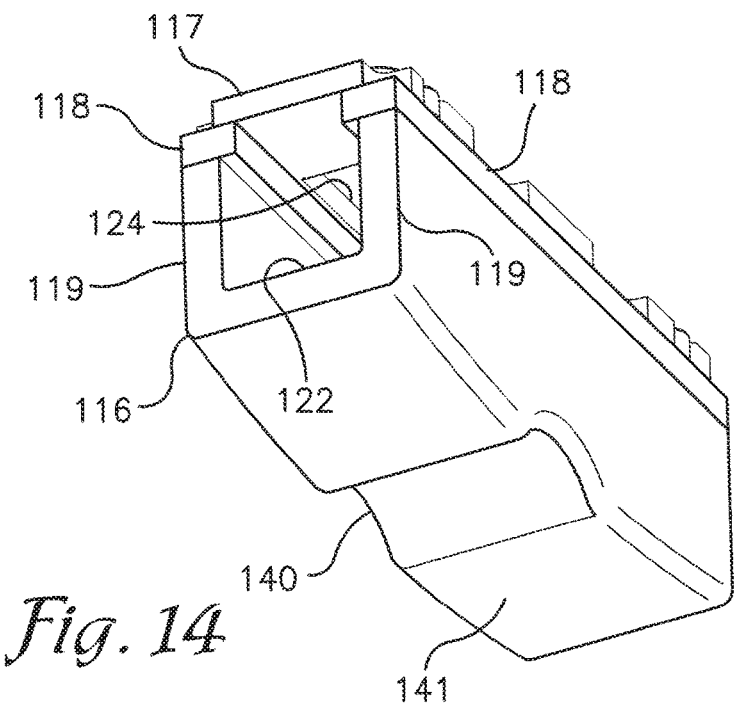
FIG. 14 is an enlarged, bottom perspective view of the alternative slide block with a transverse projection receiving groove formed in a bottom of the block.

As best seen in FIG. 14, a transverse groove 140 is formed in a floor or bottom 141 of the block 101 and U-shaped base 116. The groove 140 is sized to receive the projection 103 therein when the block 101 and torsion bar 32 are supported on the platform 42 including the alternative, elongate projection 103.

The longitudinal position of the block 101 relative to the torsion bar 32 is selectively fixed using the toothed latch assembly 105. The latch base 107 is secured to the torsion bar 32 so that the latch base 107 will extend over the projection 103 when the torsion bar 32 is supported on the shelf 42 regardless of the degree of deflection in the torsion bar 32 so that the slide block 101 can be secured on the torsion bar 32 with the transverse groove 140 aligned over the projection 103 on shelf 42. Prior to lifting the torsion bar 32 and slide block 101 onto shelf 42, and with the latch member 109 raised relative to the slot 124, the block 101 is slid over the end of the torsion bar 32 until the slot 124 is approximately centered over the latch base 107. Tool 85, as shown in FIG. 6, can be used to lift the block 101 and torsion bar 32 onto shelf 42 with the slide block cradle 89 extending into the transverse groove 140 in the bottom 141 of the block 101. When the block 101 is lifted onto the shelf 42, the advancement of the projection 103 on shelf 42 into the transverse groove 140 in the block bottom 141 will center the block 101 over the projection 103.

With the block 101 centered over the projection 103, the latch member 109 is pivoted downward to advance the latch member teeth 134 into the aligned grooves 112 in the latch base 107 and the teeth 111 in the latch base into the grooves in the latch member 109. A lock pin 144 can then be inserted through the lock pin receiving bores 130 in the pivot mounts 126 and above an upper surface of the latch member 109 to secure the latch member 109 in engagement with the latch base 107 and thereby fix the longitudinal alignment of the slide block 101 relative to the torsion bar 32. A recess 145 is formed in each of the pivot mounts 126 proximate the lock pin receiving bores 130 to receive a segment of a lock pin ring 146.

Once the torsion bar 32 and slide block 101 are loaded onto the shelf 42, the retainer bracket 75 can be connected between the shelf 42 and the mounting bracket web 57 to restrain the block 101 or torsion bar 32 from sliding off of the shelf 42. Extension of the lock pin ring 146 into the recesses 145 in pivot mounts 126 prevents pinching of the ring 146 between the pivot mounts 126 and the horizontal leg 77 of retainer bracket 75.

Figure 15:
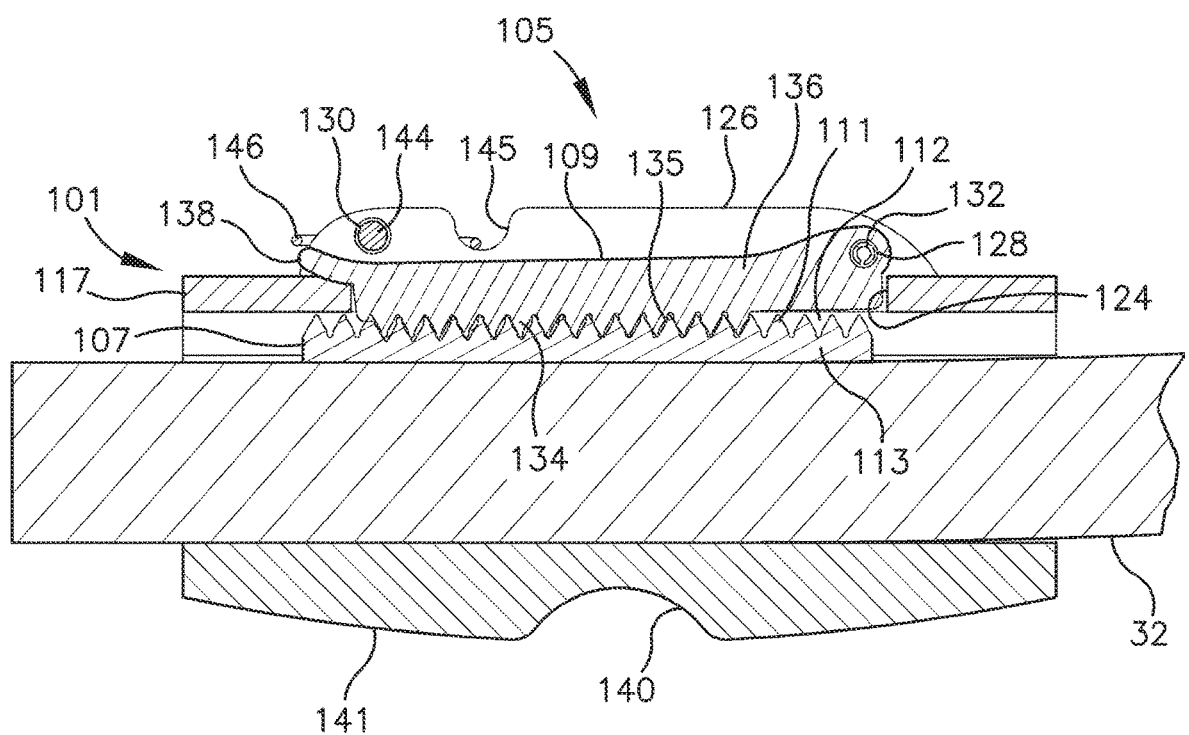
FIG. 15 is a fragmentary cross-sectional view showing the alternative slide block and latching assembly secured to one of the spring arms.
Figure 16:
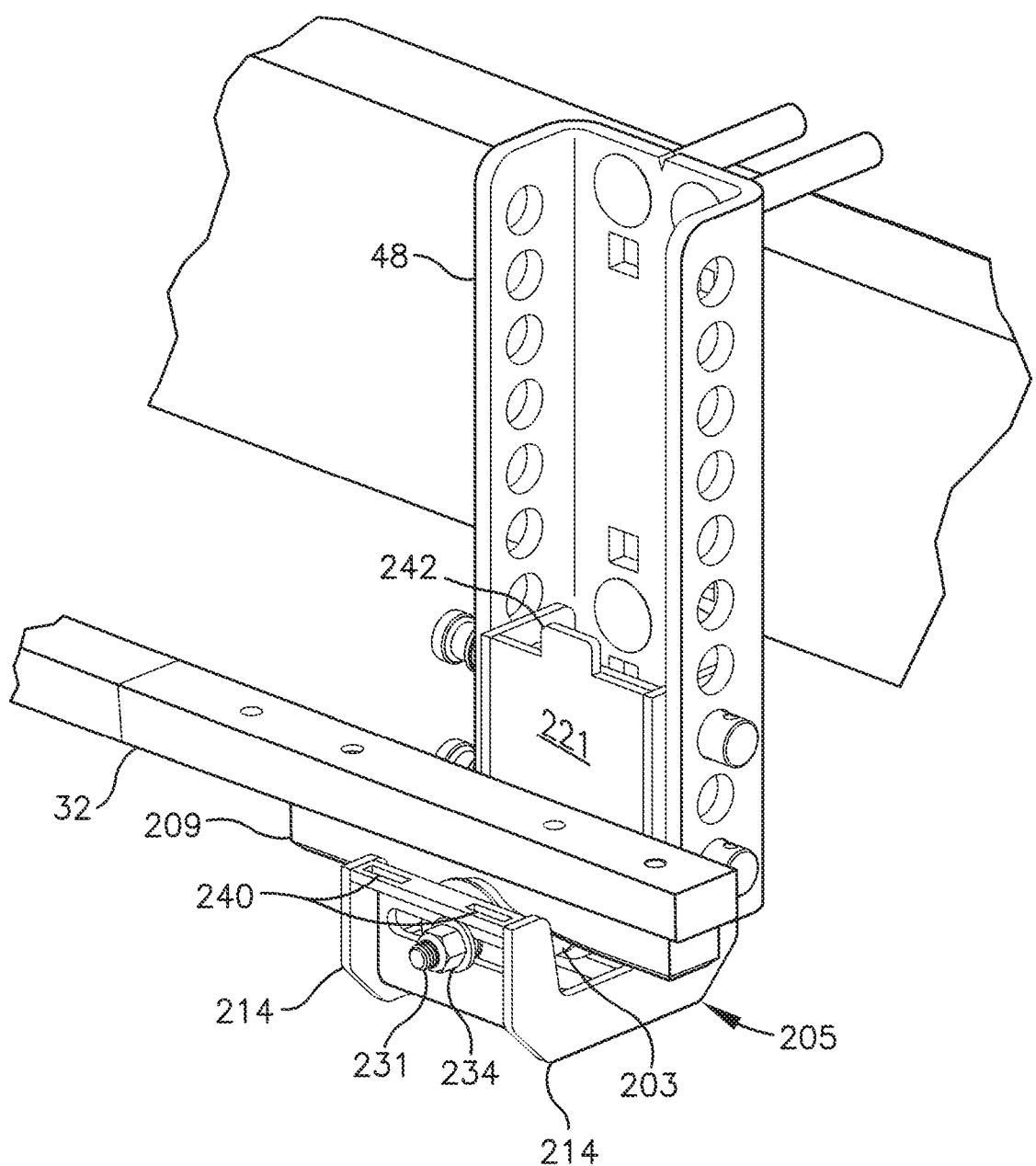
FIG. 16 is an enlarged and fragmentary perspective view of the weight distributing hitch showing a roller mounted on a roller support for supporting a spring arm with a fixed roller engagement member.
Figure 17:
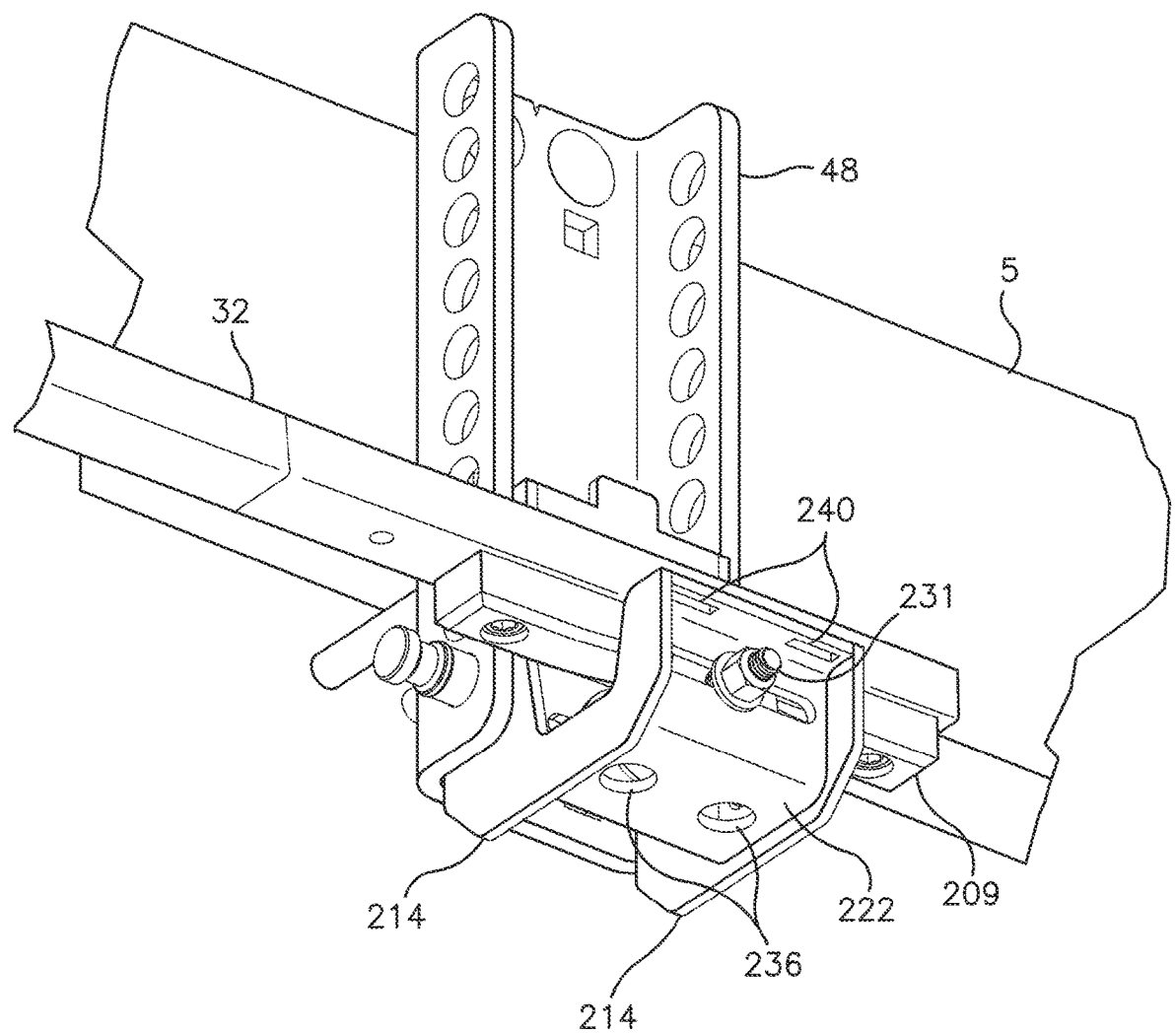
FIG. 17 is an enlarged and fragmentary, bottom perspective view of the weight distributing hitch as shown in FIG. 16 having a roller mounted on a roller support for supporting a spring arm with a fixed roller engagement member.
Figure 18:
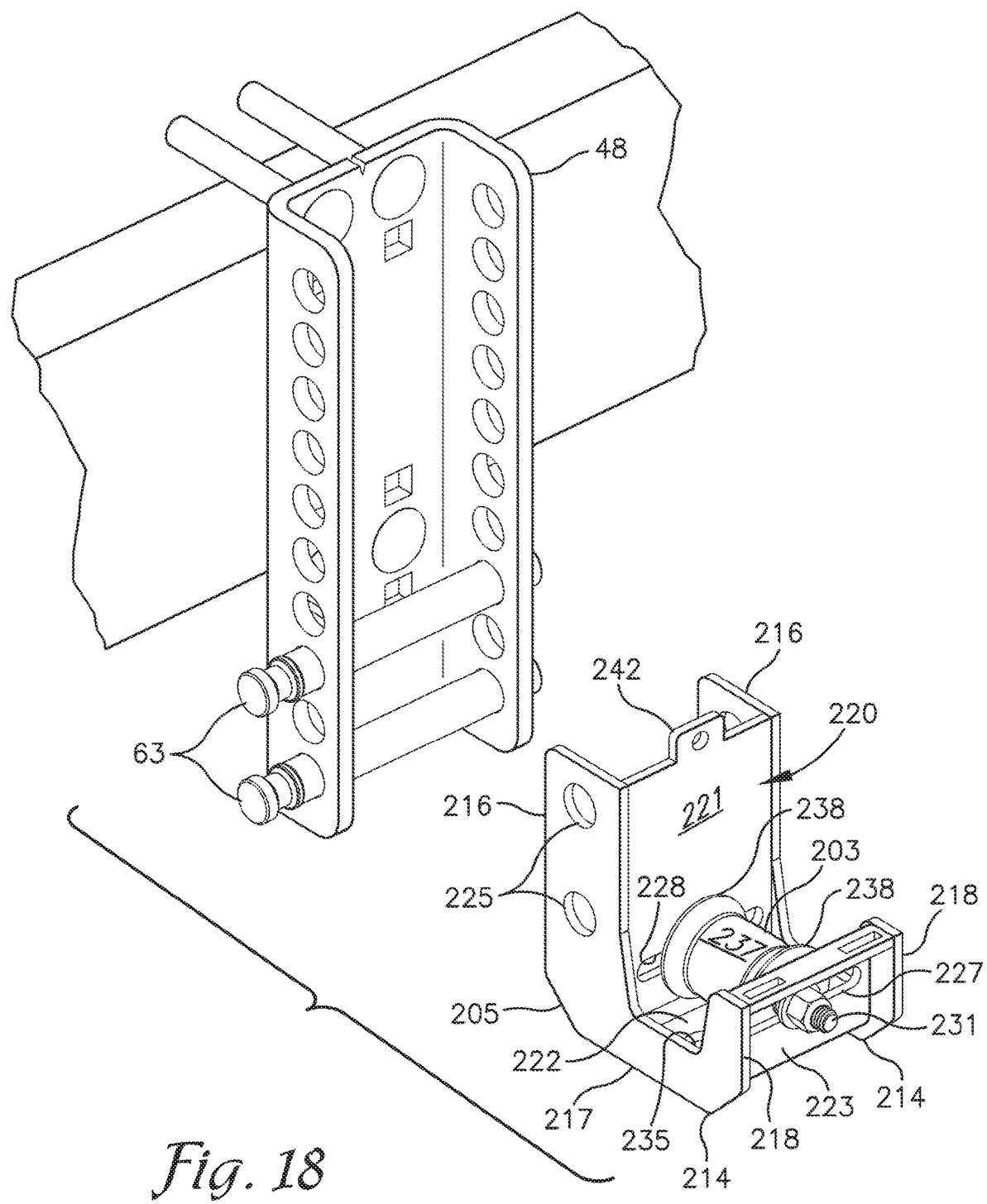
FIG. 18 is an exploded and fragmentary perspective view of the weight distributing hitch as shown in FIG. 16.
Figure 19:
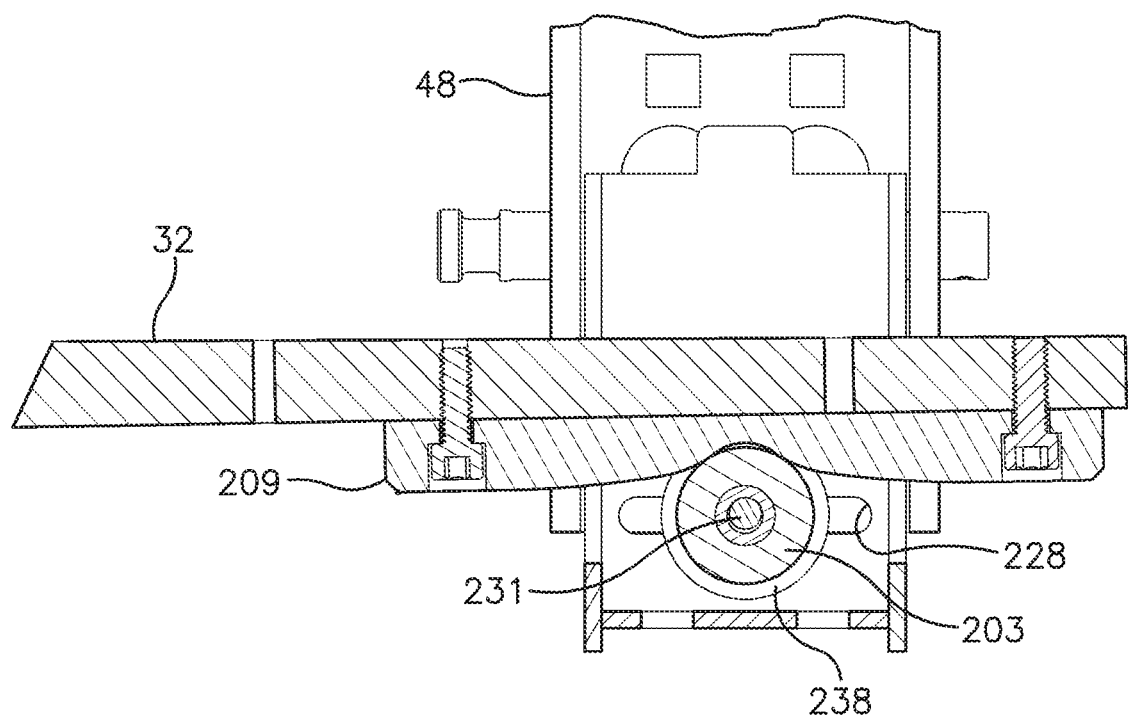
FIG. 19 is a fragmentary, cross-sectional view of the weight distributing hitch as shown in FIGS. 16-18 showing a spring arm supported on the roller when the towing vehicle and trailer are axially aligned.
Figure 20:
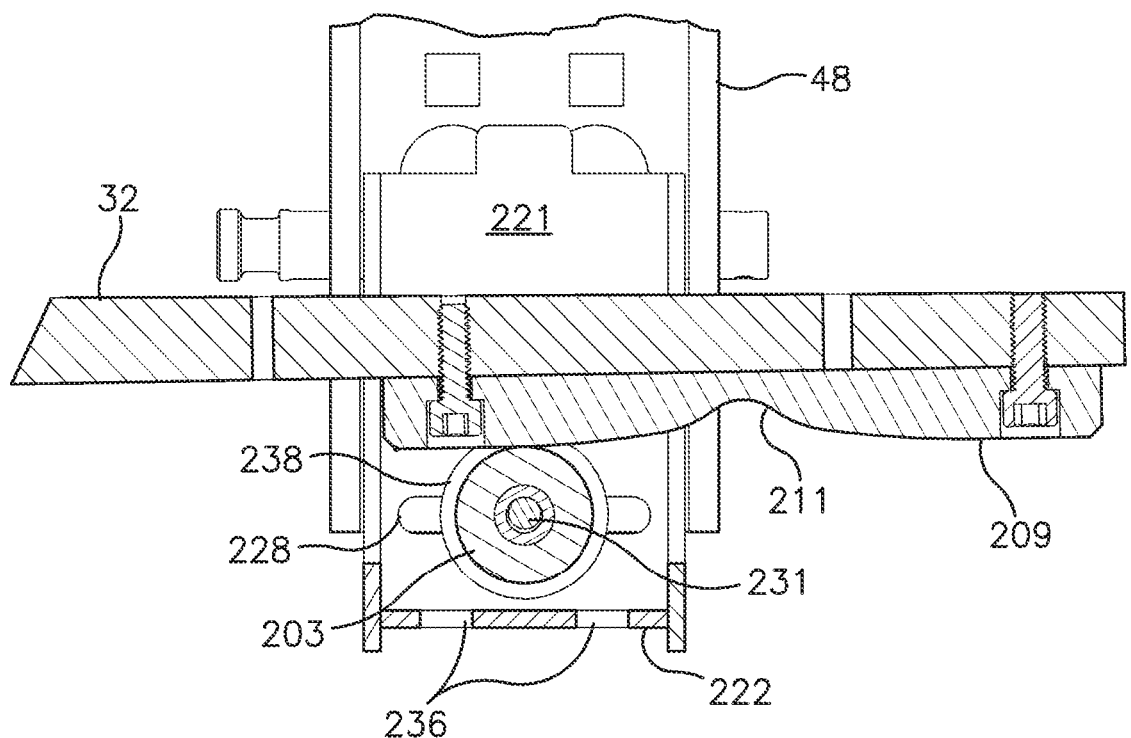
FIG. 20 is a cross-sectional view similar to FIG. 19 showing movement of the spring arm relative to the roller when the towing vehicle turns relative to the trailer.
Figure 21:
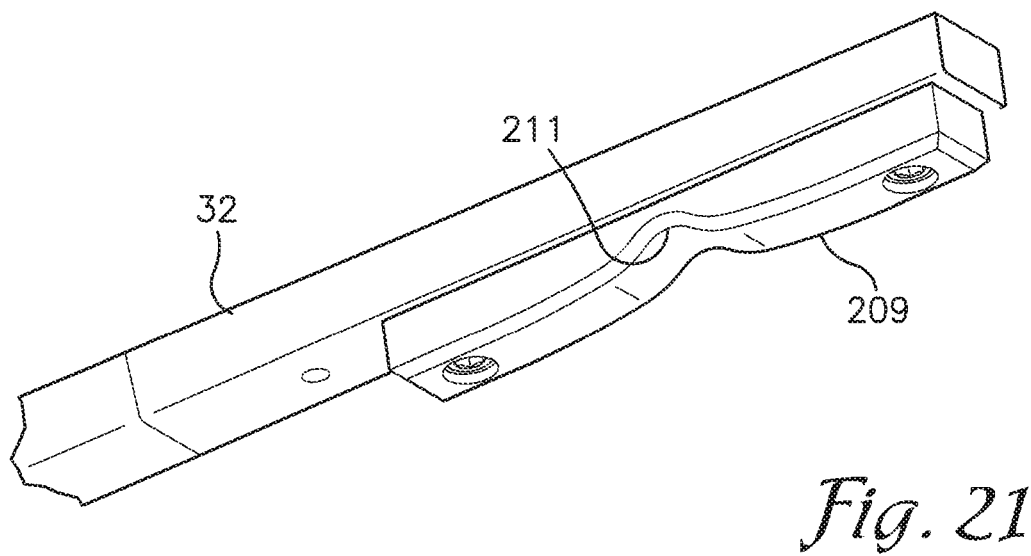
FIG. 21 is an enlarged and fragmentary, bottom perspective view of the spring arm with the fixed roller engagement member secured thereto.

As shown in FIG. 15, the bottom 141 of the slide block 101 may be sloped upward from the transverse groove 140 toward the front and rear ends to provide clearance for the front or rear edges of the block bottom 141 relative to the projection 103 to allow the bottom 141 of the block 101 to pass back over the projection 103 upon straightening of the trailer 2 relative to the vehicle 3 after the front or rear edge of the block 101 has been advanced completely past the projection 101 during a relatively sharp turn.

FIGS. 16-21 show an alternative embodiment for the weight distributing hitch in which the projection 73, shelf 42 and mounting bracket 50 are replaced with a roller 203 and roller support 205 and the adjustable slide block 65 with recess 71 is replaced with a fixed roller engagement member 209 with a transverse groove 211 formed in a lower surface thereof. The roller 203 comprises the first resistance feature and the grooved roller engagement member 209 comprises the second resistance feature. The position of the roller 203 relative to the roller support 205 is adjustable longitudinally relative to a torsion bar 32 supported on the roller 203.

A fixed roller engagement member 209 is preferably bolted to a bottom of each torsion bar 32 proximate a distal end thereof. The transverse groove 211 extends medially across the engagement member 209.

In the embodiment shown, the roller support 205 is formed from a pair of J-shaped support members 214 each including a rear leg 216, bottom leg 217 and front leg 218. A web 220 extends between the support members 214 and includes a rear panel 221, bottom panel 222 and front panel 223. Vertically aligned pin receiving holes 225 are formed in the rear leg 216 of each support member 214 to permit vertically adjustable securement of the roller support 205 to the support bracket 48 using pins 63. Vertically aligned and horizontally or longitudinally extending slots 227 and 228 are formed in and extend through the front and rear panels 223 and 221 respectively. The roller 203 is rotatably mounted on a roller axle 231 having opposite, threaded ends extending through the slots 227 and 228 in the front and rear panels 223 and 221 respectively. Nuts and washers 234 on the threaded ends of the axle 231 are selectively tightened against the front and rear panels 223 and 221 to fix the longitudinal position of the roller 203 on the roller support 205 and relative to a torsion bar 32 supported thereon. The space in which the roller 203 is supported by the roller support 205 and axle 231, between the front and rear panels 223 and 221 may be referred to as a trough or roller support trough 235. Drain holes 236 may be formed in the bottom panel 222 extending below the roller 203.

The roller 203, in the embodiment shown, is spool shaped with a cylindrical center section 237 and outwardly sloping, radial flanges 238 on each end which function to center the roller engagement member 209 on the roller 203. The transverse groove 211 in the roller engagement member 209 is sized to provide a desired amount of resistance through engagement of the portion of the roller engagement member 209 adjacent the groove 211 with the roller 203 to prevent the torsion bar 32 from moving longitudinally, fore or aft, relative to the roller 203, to prevent swaying of the trailer 2 and until the towing vehicle 3 turns relative to the trailer 2.

The torsion bars 32 may be loaded onto a respective roller 203 using a tool similar to tool 85 and it is understood that structure such as pivot bearings 95 could be incorporated into the roller support 205 to facilitate use of a tool, similar to tool 85 for loading the torsion bars 32 onto a respective roller 203. Prior to loading the torsion bar 32 onto a roller, the nuts and washers 233 are loosened to allow the axle 231 and roller 203 to slide longitudinally relative to slots 227 and 228 and roller support 205. With the towing vehicle 3 and trailer 2 extending in axial alignment, upon loading the torsion bars 32 onto a respective roller support 205, as the groove 211 of the roller engagement member 209 is advanced over the roller 203, engagement of the roller engagement member 209 surrounding the groove 211 with the roller 203 will position the roller 203 in the desired longitudinal position relative to the roller support 205. The nuts and washers 233 can then be tightened to maintain the roller 203 and axle 231 in this longitudinal position relative to the roller support 205.

A retainer bracket, similar in construction to retainer bracket 75, may be used to prevent the torsion bar 32 from sliding off of the roller support 205. Slots 240, sized and spaced to receive the feet 79 of the vertical leg 76 of a retainer bracket 75, may be formed in a horizontal panel or lip 241 extending between the front legs 218 of the J-shaped support members 214 and at upper ends thereof. A tab 242 is formed on the upper edge of the rear panel 221 of the web 220 to extend into the tab receiving slot 81 of the horizontal leg 77 of the retainer bracket 75.

Figure 22:
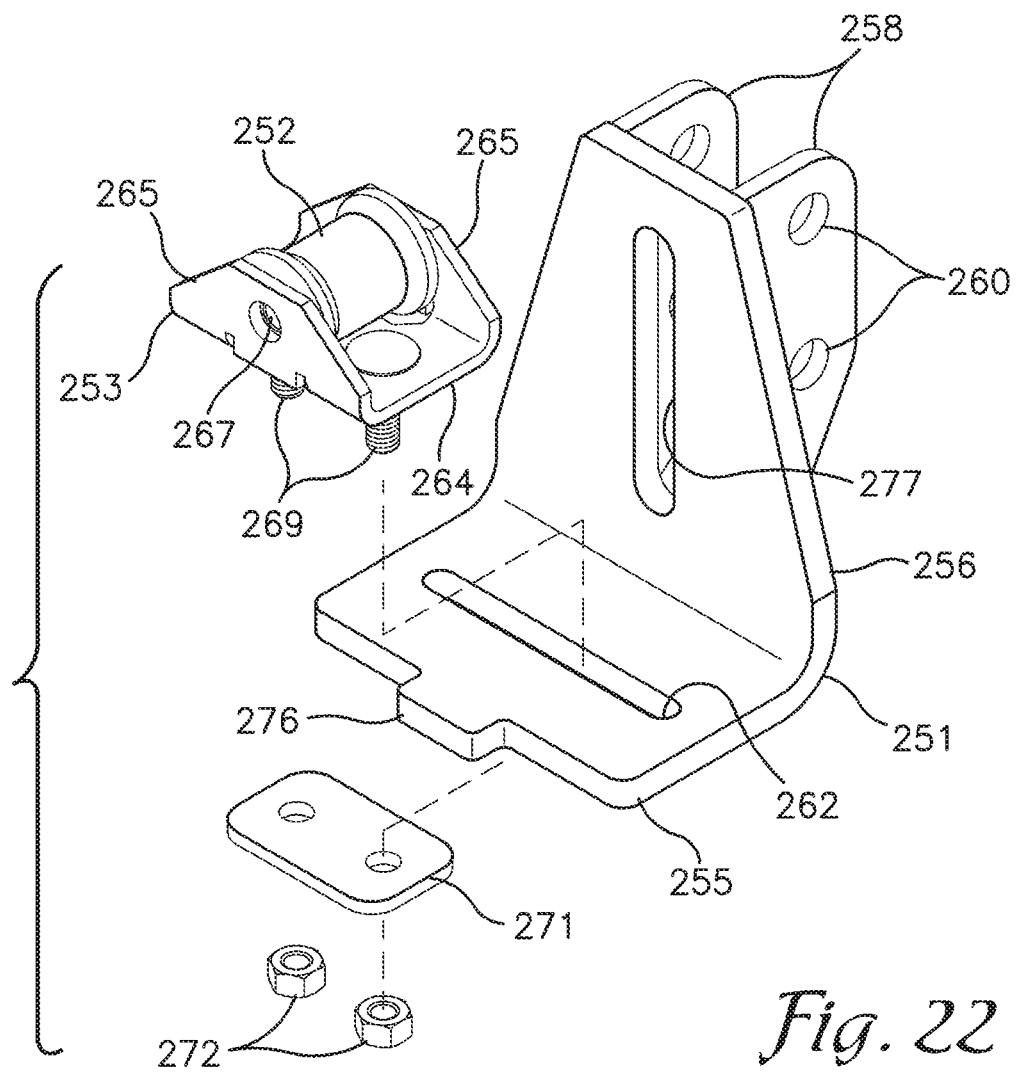
FIG. 22 is an exploded, perspective view of an alternative roller support with a roller mounted on a roller carrier which is slidably mounted on the roller support.

FIG. 22 shows an alternative embodiment of a roller support 251, with a roller 252 rotatably mounted on a U-shaped roller carrier 253 which is slidably mounted on the roller support 251. The roller support 251 is adapted for use with the grooved, roller engagement members 209 fixed to the ends of each torsion bar 32 as with the embodiment shown in FIGS. 16-21. The roller support 251 is L-shaped with a planar base 255 and a vertical leg 256. A pair of mounting flanges 258 project rearward from the vertical leg 256. Vertically spaced holes 260 are formed in the mounting flanges 258 and are sized and spaced to permit vertically adjustable securement of the roller support 251 to the support bracket 48 using pins 63.

A longitudinally extending slot 262 is formed in and extends through the base 255 of the roller support 251. The roller carrier 253 includes a base 264 and two sidewalls 265. A roller axle 267 is secured between the sidewalls 265 and the roller 252 is rotatably mounted on the axle 267. Two bolts 269 extend through the base 255 of the roller carrier 253 and the slot 262. A washer plate 271 and nuts 272 are secured over the ends of the bolts 269 for selectively tightening on the bolts 269 against the bottom of the roller support base 255 to fix the longitudinal position of the roller carrier 253 and the roller 252 relative to the roller support base 255. Tab 276 on the roller support base 255 and slot 277 in the vertical leg 256 of the roller support 251 may be used for securing a retainer or retainer bracket (not shown but similar to retainer bracket 75) to the roller support 251 for preventing a torsion bar 32 loaded onto the roller 252 from sliding off the roller 252 and roller support 251.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from respectively, the geometric center of the embodiment being described and designated parts thereof. Said terminology will include the words specifically mentioned, derivatives thereof and words of a similar import.

It is to be understood that while certain forms of the present invention have been illustrated and described herein, it is not to be limited to the specific forms or arrangement of parts described and shown. As used in the claims, identification of an element with an indefinite article "a" or "an" or the phrase "at least one" is intended to cover any device assembly including one or more of the elements at issue. Similarly, references to first and second elements is not intended to limit the claims to such assemblies including only two of the elements, but rather is intended to cover two or more of the elements at issue. Only where limiting language such as "a single" or "only one" with reference to an element, is the language intended to be limited to one of the elements specified, or any other similarly limited number of elements.

What is claimed is:

1. A weight distributing hitch assembly for towing a trailer behind a towing vehicle, the trailer including a trailer frame and the weight distributing hitch comprising:
    a ball mount head;
    a deflection bar having a first end connected to said ball mount head and a second end projecting outward from said ball mount head;
    a deflection bar support connectable to the trailer frame and a first resistance feature associated with the deflection bar support; said deflection bar selectively supportable by said deflection bar support;
    a block adjustably mounted to said deflection bar and having a second resistance feature formed thereon; a longitudinal position of said block relative to said deflection bar being adjustable to position said second resistance feature on said block in engagement with said first resistance feature on said deflection bar support when said block is supported on said deflection bar support; and
    securement means for selectively securing the longitudinal position of said block and said second resistance feature relative to said deflection bar such that engagement of said second resistance feature on said block with said first resistance feature on said deflection bar support resists sliding of said block and said deflection bar relative to said deflection bar support until a force applied longitudinally through said deflection bar urges said second resistance feature out of engagement with said first resistance feature.

2. The weight distributing hitch assembly as in claim 1 wherein said securement means comprises at least one set screw threadingly secured in said block and selectively driven into frictional engagement with the deflection bar to secure the longitudinal position of said block to said deflection bar.

3. The weight distributing hitch assembly as in claim 1 wherein said securement means comprises a latch member pivotally connected to said block and a latch base connected to said deflection bar and wherein said latch member is pivotally advanceable into engagement with said latch base in one of a plurality of closely spaced alignments to secure said block to said deflection bar in a selected alignment.

4. The weight distributing hitch assembly as in claim 1 wherein said first resistance feature comprises a projection extending upward from said deflection bar support and said second resistance feature comprises a recess formed in said block.

5. The weight distributing hitch assembly as in claim 1 further comprising a support bracket connectable to the trailer frame and the deflection bar support is selectively securable to the support bracket at any one of a plurality of fixed heights relative to the support bracket.

6. The weight distributing hitch assembly as in claim 5 further comprising a retainer removably securable to the deflection bar support to extend upward from a side of the deflection bar support opposite said support bracket and over the deflection bar supported on the deflection bar support.

7. The weight distributing hitch assembly as in claim 1 further comprising a support bracket connectable to the trailer frame and said deflection bar support comprises a support shelf fixedly connected to and projecting laterally outward from a mounting bracket which is selectively securable to the support bracket at any one of a plurality of fixed heights relative to the support bracket and wherein the first resistance feature comprises a projection projecting upward from the support shelf and the second resistance feature comprises a recess formed in a bottom surface of said block.

8. A weight distributing hitch assembly for towing a trailer behind a towing vehicle, the trailer including a trailer frame and the weight distributing hitch comprising:
 a ball mount head;
 a deflection bar having a first end connected to said ball mount head and a second end projecting outward from said ball mount head;
 a trailer frame mount connectable to the trailer frame;
 a deflection bar support selectively securable to the trailer frame mount at any one of a plurality of fixed heights relative to the trailer frame mount, the deflection bar support having a first resistance feature associated therewith;
 a second resistance feature associated with said deflection bar; said deflection bar selectively supportable by said deflection bar support with said second resistance feature associated with said deflection bar engaging said first resistance feature associated with said deflection bar support;
 a longitudinal position of said second resistance feature relative to said deflection bar or a longitudinal position of said first resistance feature relative to said deflection bar supported by said deflection bar support is adjustable to position said second resistance feature in engagement with said first resistance feature when said deflection bar is supported by said deflection bar support;
 means for selectively securing the longitudinal position of said second resistance feature relative to said deflection bar or means for selectively securing the longitudinal position of the first resistance feature relative to said deflection bar supported on the deflection bar support such that engagement of said second resistance feature with said first resistance feature resists sliding of said deflection bar relative to said deflection bar support until a force applied longitudinally through said deflection bar urges said second resistance feature out of engagement with said first resistance feature.

9. The weight distributing hitch assembly as in claim 8 wherein said first resistance feature comprises a projection extending upward from said deflection bar support and said second resistance feature comprises a recess formed in a block mounted on said deflection bar.

10. The weight distributing hitch assembly as in claim 9 wherein said block is slidably mounted on said deflection bar to slide longitudinally relative to said deflection bar to adjust the longitudinal position of said recess relative to said deflection bar.

11. The weight distributing hitch assembly as in claim 8 wherein said first resistance feature comprises a roller and the second resistance feature comprises a recess formed in a roller engagement member mounted on the deflection bar.

12. The weight distributing hitch assembly as in claim 11 wherein the longitudinal position of said roller is selectively adjustable relative to the deflection bar supported on said roller.

13. The weight distributing hitch assembly as in claim 8 further comprising a retainer removably securable to the deflection bar support to extend upward from a side of the deflection bar support opposite said trailer frame mount and over the deflection bar supported on the deflection bar support.

14. The weight distributing hitch assembly as in claim 8 wherein said deflection bar support comprises a support shelf fixedly connected to and projecting laterally outward from a mounting bracket which is selectively securable to the trailer frame mount at any one of a plurality of fixed heights relative to the trailer frame mount and wherein the first resistance feature comprises a projection projecting upward from the support shelf and the second resistance feature comprises a recess formed in a block slidably mounted on said deflection bar.

15. A weight distributing hitch assembly for towing a trailer behind a towing vehicle, the trailer including a trailer frame and the weight distributing hitch comprising:
 a ball mount head;
 a deflection bar having a first end connected to said ball mount head and a second end projecting outward from said ball mount head;
 a support bracket connectable to the trailer frame;
 a deflection bar support comprising a support shelf fixedly connected to and projecting laterally outward from a mounting bracket which is selectively securable to the support bracket at any one of a plurality of fixed heights relative to the support bracket, a projection projecting upward from the support shelf;
 a block slidably mounted to said deflection bar and having a recess formed on a bottom surface thereof, the recess sized and shaped to receive at least a portion of the projection therein; said block is slidable longitudinally relative to said deflection bar to position said block such that at least a portion of said projection extends into said recess in said bottom of said block when said block is supported on said support shelf; securement means for fixing the longitudinal position of said block to said deflection bar such that engagement of said projection on said support shelf with said block within said recess resists sliding of said block and said deflection bar relative to said support shelf until a force applied longitudinally through said deflection bar urges said block out of engagement with said projection.

16. The weight distributing hitch assembly as in claim 15 wherein said securement means comprises at least one set screw threadingly secured in said block and selectively driven into frictional engagement with the deflection bar to secure the longitudinal position of said block to said deflection bar.

17. The weight distributing hitch assembly as in claim 15 wherein said securement means comprises a latch member pivotally connected to said block and a latch base connected to said deflection bar and wherein said latch member is pivotally advanceable into engagement with said latch base in one of a plurality of closely spaced alignments to secure said block to said deflection bar in a selected alignment.

18. The weight distributing hitch assembly as in claim 15 further comprising a hook engaging feature on said support shelf and a tool for loading said deflection bar and said block onto said support shelf, the tool including a cradle, a lever arm projecting from one end of the cradle and a pivot hook projecting from an opposite end of the cradle, the cradle is sized and shaped to cradle a portion of said block secured to said deflection bar and said hook insertable within said hook receiving slot in said support shelf, such that pivoting of said tool upwards and towards said support bracket and relative to said hook engaging feature on said support shelf lifts said block and said deflection bar onto said support shelf.

* * * * *